US012416925B2

(12) United States Patent
Nakazawa et al.

(10) Patent No.: US 12,416,925 B2
(45) Date of Patent: Sep. 16, 2025

(54) LEARNING DEVICE, INFORMATION PROCESSING DEVICE, AND LEARNED CONTROL MODEL

(71) Applicant: RAKUTEN GROUP, INC., Tokyo (JP)

(72) Inventors: Mitsuru Nakazawa, Tokyo (JP); Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 611 days.

(21) Appl. No.: 17/419,104

(22) PCT Filed: Sep. 25, 2020

(86) PCT No.: PCT/JP2020/036346
§ 371 (c)(1),
(2) Date: Jun. 28, 2021

(87) PCT Pub. No.: WO2021/220528
PCT Pub. Date: Nov. 4, 2021

(65) Prior Publication Data
US 2022/0308598 A1    Sep. 29, 2022

(30) Foreign Application Priority Data

Apr. 30, 2020  (WO) .................. PCT/JP2020/018278

(51) Int. Cl.
*G05D 1/00*    (2024.01)
*B64C 13/18*    (2006.01)
(Continued)

(52) U.S. Cl.
CPC .......... *G05D 1/0816* (2013.01); *B64C 13/18* (2013.01); *G05D 1/106* (2019.05);
(Continued)

(58) Field of Classification Search
CPC ...... G05D 1/0816; G05D 1/106; B64C 13/18; G06N 20/00; G06N 3/092; B64U 2101/30; B64U 2101/35; B64U 2201/10
(Continued)

(56) References Cited

U.S. PATENT DOCUMENTS 9,710,218 B2*  7/2017  Khatwa ..................... G01S 7/24
2006/0155660 A1*  7/2006  Koshizen ............. G05B 13/027
706/18
(Continued)

FOREIGN PATENT DOCUMENTS

CN    109270522 A    1/2019
CN    110488861 A    11/2019
(Continued)

OTHER PUBLICATIONS

International search report in Japanese for PCT/JP2020/036346 dated Dec. 1, 2020.
(Continued)

*Primary Examiner* — Isaac G Smith
(74) *Attorney, Agent, or Firm* — Sughrue Mion, PLLC

(57) ABSTRACT

The learning system SY1 acquires control information output from a control model M by inputting to the control model M environmental information including weather information in at least one of a surrounding environment of an unmanned aerial vehicle P and an environment of a planned flight area of an unmanned aerial vehicle P, and when the unmanned aerial vehicle P takes an action based on the control information, performs reinforcement learning of the control model M using a reward r representing an evaluation of a result of the action.

17 Claims, 10 Drawing Sheets

(51) Int. Cl.
*B64U 101/30* (2023.01)
*B64U 101/35* (2023.01)
*G06N 20/00* (2019.01)

(52) U.S. Cl.
CPC ...... *B64U 2101/30* (2023.01); *B64U 2101/35* (2023.01); *B64U 2201/10* (2023.01); *G06N 20/00* (2019.01)

(58) Field of Classification Search
USPC .......................................................... 701/3
See application file for complete search history.

(56) References Cited

U.S. PATENT DOCUMENTS

| | | | |
|---|---|---|---|
| 2019/0019423 A1 | 1/2019 | Choi et al. | |
| 2019/0202463 A1* | 7/2019 | Anderson | B60W 50/0097 |
| 2020/0023942 A1* | 1/2020 | Rathay | G07C 5/0808 |
| 2020/0082731 A1 | 3/2020 | Choi et al. | |
| 2020/0293041 A1* | 9/2020 | Palanisamy | G06N 3/08 |
| 2020/0372809 A1* | 11/2020 | Ganti | G08G 5/0052 |
| 2020/0379486 A1* | 12/2020 | Khosla | G05B 13/0265 |
| 2022/0281585 A1* | 9/2022 | Wada | B64C 9/02 |

FOREIGN PATENT DOCUMENTS

| | | |
|---|---|---|
| CN | 110502200 A | 11/2019 |
| CN | 110673637 A | 1/2020 |
| JP | 2018-198012 A | 12/2018 |
| JP | 2019-055769 A | 4/2019 |
| JP | 2019-059461 A | 4/2019 |
| JP | 2019-525864 A | 9/2019 |
| JP | 2019-200712 A | 11/2019 |
| JP | 2019-220833 A | 12/2019 |

OTHER PUBLICATIONS

Concise Explanation of Chinese Office Action issued Sep. 20, 2023 in Application No. 202080007830.0.

* cited by examiner

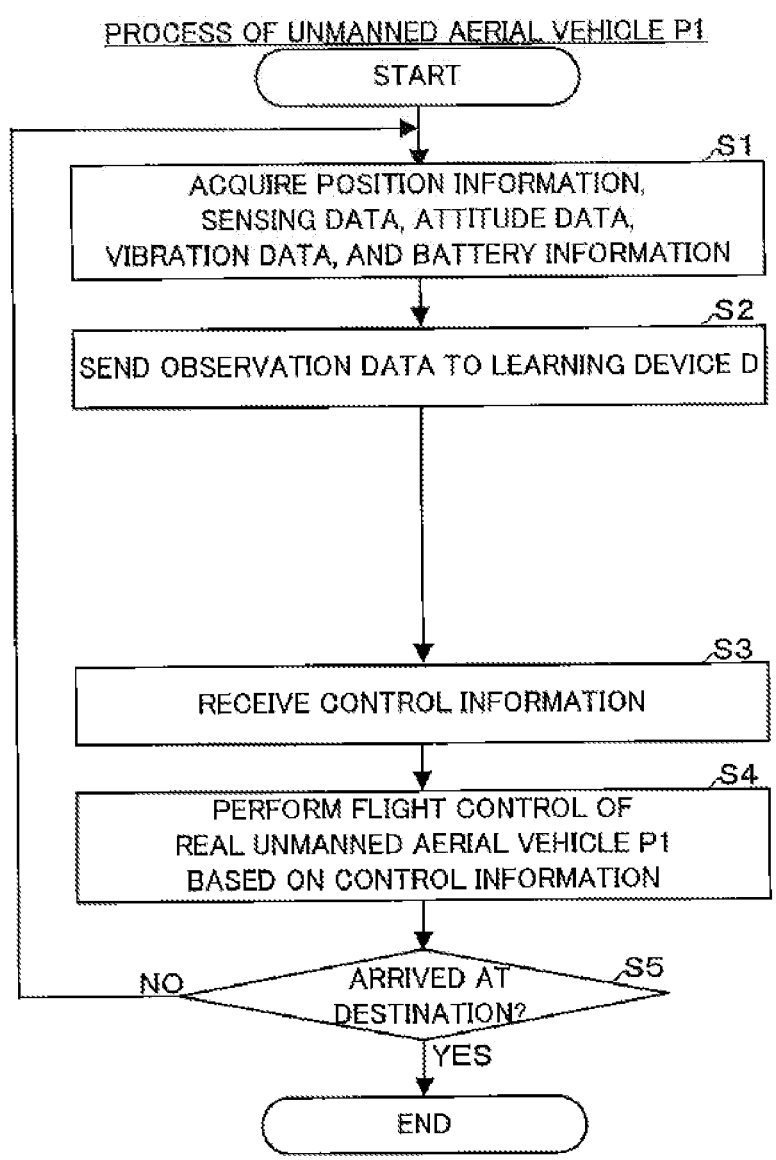

LEARNING DEVICE, INFORMATION PROCESSING DEVICE, AND LEARNED CONTROL MODEL

CROSS-REFERENCE TO RELATED APPLICATIONS

This application is a National Stage of International Application No. PCT/JP2020/036346 filed Sep. 25, 2020, claiming the priority of International Application No. PCT/JP2020/018278 filed on Apr. 30, 2020.

TECHNICAL FIELD

The present invention relates to a technical field such as a device for reinforcement learning of a control model that outputs control information for performing flight control of an aerial vehicle capable of flying unmanned.

BACKGROUND ART

It has been studied in the past to use reinforcement learning, which is a kind of machine learning, in order to control the movement of a mobile device. For example, Patent Literature 1 discloses a technique for performing reinforcement learning related to movement control of a mobile device by inputting an image taken by a mobile device such as a car or a drone.

CITATION LIST

Patent Literature

Patent Literature 1: JP 2018-198012 A

SUMMARY OF INVENTION

Technical Problem

By the way, aerial vehicles capable of flying unmanned such as drones are susceptible to weather. For example, even if the flight control of an aerial vehicle is performed by the above technique, it is considered that the power consumption increases or the flight becomes unstable in the case of flying against the wind.

Therefore, one or more embodiments of the present invention are directed to provide a learning device, an information processing device, and a learned control model that can obtain control information for performing flexible flight control that reduces influence of weather in the surrounding environment of an aerial vehicle capable of flying unmanned.

Solution to Problem

In response to the above issue, the invention according to claim 1 is a learning device for performing reinforcement learning of a control model that outputs control information for performing flight control of an aerial vehicle capable of flying unmanned. A learning device includes: an environmental information acquisition unit that acquires environmental information including weather information in at least one of a surrounding environment of the aerial vehicle and an environment of a planned flight area of the aerial vehicle; a control information acquisition unit that acquires the control information output from the control model by inputting the environmental information to the control model; a reward identifying unit that identifies a reward that represents an evaluation of a result of an action when the aerial vehicle takes the action based on the control information; and a learning control unit that controls reinforcement learning of the control model using the reward that is identified by the reward identifying unit. This makes it possible to obtain control information for performing flexible flight control that reduces the influence of weather in the surrounding environment of an aerial vehicle capable of flying unmanned and the like.

The invention according to claim 2 is the learning device according to claim 1, wherein the reward identifying unit identifies the reward that varies depending on an attitude of the aerial vehicle when the aerial vehicle takes the action. Thus, the control model can be learned so as to output control information for causing the aerial vehicle to perform a flight that keeps the attitude of the aerial vehicle stable even under the influence of the weather.

The invention according to claim 3 is the learning device according to claim 1 or 2, wherein the reward identifying unit identifies the reward that varies depending on flight stability of the aerial vehicle when the aerial vehicle takes the action. Thus, the control model can be learned so as to output control information for causing the aerial vehicle to fly with high flight stability even under the influence of the weather.

The invention according to claim 4 is the learning device according to claim 3, wherein the flight stability is evaluated based on vibration of the aerial vehicle.

The invention according to claim 5 is the learning device according to any one of claims 1 to 4, wherein the reward identifying unit identifies the reward that varies depending on an altitude of the aerial vehicle when the aerial vehicle takes the action. Thus, the control model can be learned so as to output control information for causing the aerial vehicle to perform a flight that keeps the altitude of the aerial vehicle safe even under the influence of the weather.

The invention according to claim 6 is the learning device according to any one of claims 1 to 5, wherein the reward identifying unit identifies the reward that varies depending on whether or not the altitude of the aerial vehicle is included in a specific altitude range when the aerial vehicle takes the action. Thus, the control model can be learned so as to output control information for causing the aerial vehicle to perform a flight that keeps the altitude of the aerial vehicle within the specific altitude range even under the influence of the weather.

The invention according to claim 7 is the learning device according to claim 6, wherein the altitude range dynamically changes based on sensing data that is obtained by non-contact sensing from sky by the aerial vehicle.

The invention according to claim 8 is the learning device according to any one of claims 1 to 7, wherein the reward identifying unit identifies the reward that varies depending on relationship between an accumulated precipitation on the aerial vehicle and a threshold value according to waterproof performance of the aerial vehicle when the aerial vehicle takes the action. Thus, the control model can be learned so as to output control information for causing the aerial vehicle to fly without affecting the waterproof performance of the aerial vehicle even under the influence of rainfall.

The invention according to claim 9 is the learning device according to any one of claims 1 to 8, wherein the reward identifying unit identifies the reward that varies depending on a remaining capacity of a battery of the aerial vehicle or consumption of the battery when the aerial vehicle takes the action. Thus, the control model can be learned so as to output control information for causing the aerial vehicle to perform a flight that reduces battery consumption even under the influence of weather.

The invention according to claim 10 is the learning device according to any one of claims 1 to 9, wherein the reward identifying unit identifies the reward that varies depending on the ground surface characteristics in a surrounding environment of the aerial vehicle when the aerial vehicle takes the action. Thus, the control model can be learned so as to output control information for causing the aerial vehicle to fly according to the ground surface characteristics even under the influence of weather.

The invention according to claim 11 is the learning device according to any one of claims 1 to 10, wherein the reward identifying unit identifies the reward that varies depending on a moving state of the aerial vehicle when the aerial vehicle takes the action. Thus, the control model can be learned so as to output control information for causing the aerial vehicle to fly more efficiently even under the influence of the weather.

The invention according to claim 12 is the learning device according to any one of claims 1 to 11, wherein the weather information includes wind information on wind.

The invention according to claim 13 is the learning device according to claim 12, wherein the wind information includes information on at least one of wind speed, wind direction, presence or absence of wind, presence or absence of strong wind, typhoon, and tornado.

The invention according to claim 14 is an information processing device includes a storage unit that stores a learned control model that inputs environmental information including weather information in at least one of a surrounding environment of an aerial vehicle capable of flying unmanned and an environment of a planned flight area of the aerial vehicle and outputs control information for performing flight control of the aerial vehicle. The control model is obtained by performing reinforcement learning using a reward representing an evaluation of a result of an action of the aerial vehicle when the aerial vehicle takes the action based on the control information. The information processing device further includes a control information acquisition unit that acquires the control information output from the control model by inputting the environmental information including weather information to the control model.

The invention according to claim 15 is the information processing device according to claim 14 further including a flight control unit that performs flight control of the aerial vehicle on the basis of the control information.

The invention according to claim 16 is a learned control model for causing a computer to function so as to output control information for performing flight control of an aerial vehicle capable of flying unmanned, based on environmental information on at least one of a surrounding environment of the aerial vehicle and an environment of a planned flight area of the aerial vehicle. The environmental information includes weather information in the surrounding environment of the aerial vehicle or the environment of the planned flight area of the aerial vehicle, and is input to the control model in time series. The control model is reinforcement-learned using a reward representing an evaluation of a result of an action of the aerial vehicle when the aerial vehicle takes the action based on the control information output from the control model, and the learned control model causes a computer to function so as to perform an operation based on a function constituting the control model with respect to the input environment information and output the control information from the control model.

Advantageous Effect of the Invention

According to one or more embodiments of the present invention, it is possible to obtain control information for performing flexible flight control that reduces the influence of weather in the surrounding environment of an aerial vehicle capable of flying unmanned and the like.

BRIEF DESCRIPTION OF THE DRAWINGS

FIG. 8A is a flowchart showing an example of a process of the real unmanned aerial vehicle P1.

DESCRIPTION OF EMBODIMENTS

Hereinafter, an embodiment of the present invention will be described with reference to the drawings.

[1. Background of Flight Control of Unmanned Aerial Vehicle P]

Figure 1:
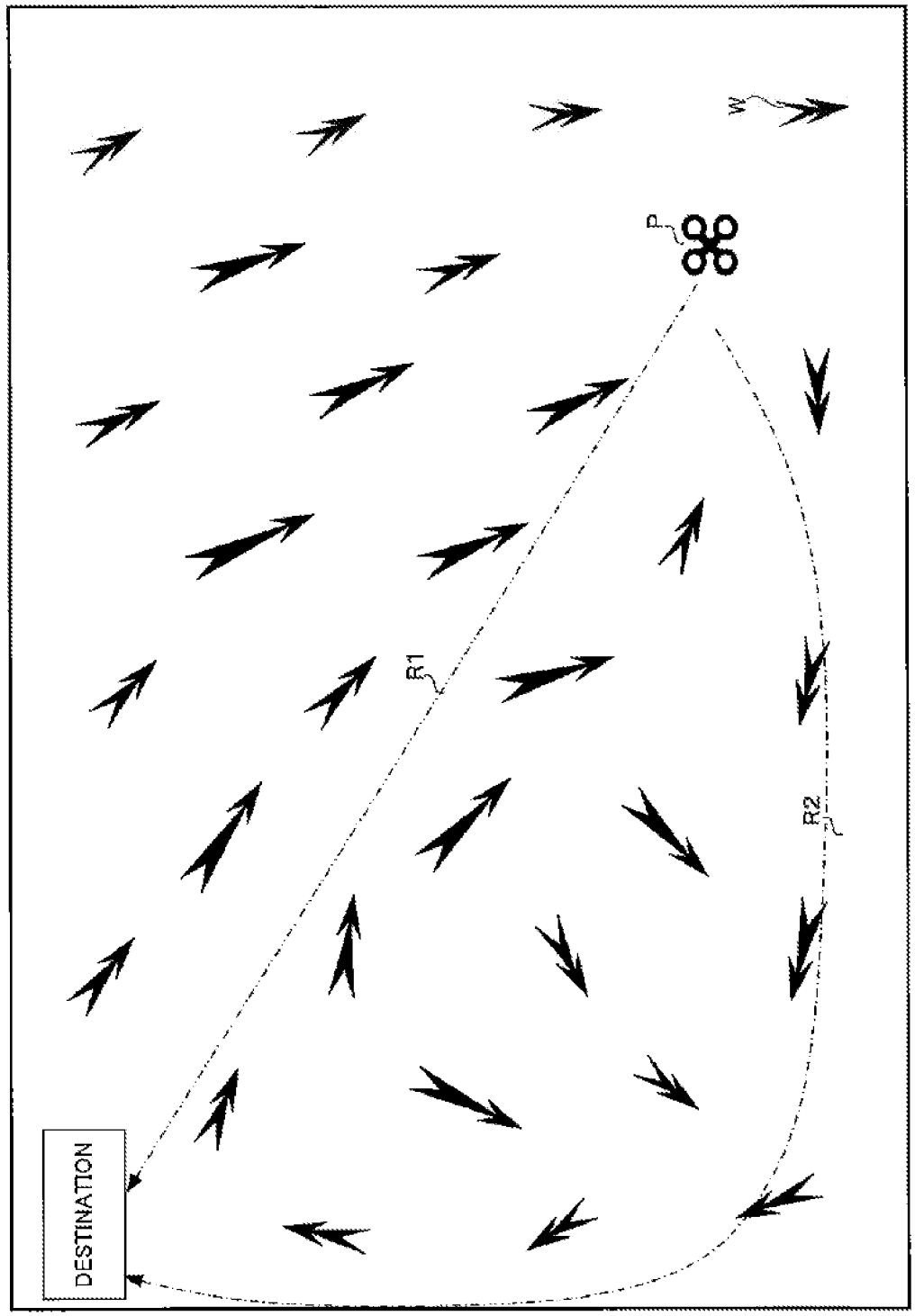
FIG. 1 is a conceptual diagram showing an example of wind speed and wind direction in a surrounding environment of an unmanned aerial vehicle P flying toward a destination and an environment of a planned flight area.

First, the background relating to flight control of an unmanned aerial vehicle P (an example of an aerial vehicle capable of flying unmanned) will be described with reference to FIG. 1. FIG. 1 is a conceptual diagram showing an example of wind speed and wind direction in a surrounding environment of the unmanned aerial vehicle P flying toward a destination and an environment of a planned flight area (for example, including the destination). Incidentally, in FIG. 1, a plurality of arrows each represent the wind speed (wind strength) and the wind direction, and the longer the arrow, the stronger the wind at that position. The unmanned aerial vehicle P is also called a drone, or a multicopter.

Since the unmanned aerial vehicle P has limited electric power, it desirably arrives at the destination as short as possible along a flight route R1, for example, as shown in FIG. 1. However, in this case, since the unmanned aerial vehicle P will fly against the wind, a large propulsive force (propulsive force for advancing) is required as compared with the case of not flying against the wind, which is expected to cause the power consumption of the unmanned aerial vehicle P to increase. For example, as shown in FIG. 1, it is expected that the power consumption of the unmanned aerial vehicle P is smaller when the unmanned aerial vehicle P flies along a flight route R2, which is longer than the flight route R1, under tail wind conditions. Moreover, when the unmanned aerial vehicle P flies against the wind, its flight may become unstable. Therefore, it is necessary to finely adjust and stabilize the attitude of the unmanned aerial vehicle P with respect to the wind, which thus consumes a larger amount of electric power. As a result, there is concern that the flight distance of the unmanned aerial vehicle P will be shortened. Moreover, the wind speed and the wind direction can change from moment to moment.

In the case where the unmanned aerial vehicle P is operated from the ground, it is not easy even for a skilled operator to perform flight control of the unmanned aerial vehicle P so as to reduce the power consumption as much as possible while keeping the unmanned aerial vehicle P stable in consideration of the influence of the wind as described above. In addition to the wind, the surrounding environment of the unmanned aerial vehicle P and the environment of the planned flight area may include rain, snow, and lightning, so it is further not easy to perform flight control of the unmanned aerial vehicle P more appropriately in consideration of these weather conditions. In autonomous flight control of the unmanned aerial vehicle P, for example, when flight control corresponding to the weather such as wind is to be realized, it is difficult to perform rule-based control pre-designed by a human. For example, it is difficult to design control such that a predetermined flight control is performed when a predetermined condition is satisfied because the rules are too complicated. Therefore, the learning system described below realizes flight control that reduces the influence of weather in the surrounding environment of the unmanned aerial vehicle P and the environment of the planned flight area. As a result, for example, it is possible to autonomously fly the unmanned aerial vehicle P to the destination while selecting a flight route with good power efficiency, and further, autonomous flight considering safety aspects such as the stability and flight altitude of the airframe is possible.

[2. Configuration and Function Outline of Learning System SY1]

Figure 2:
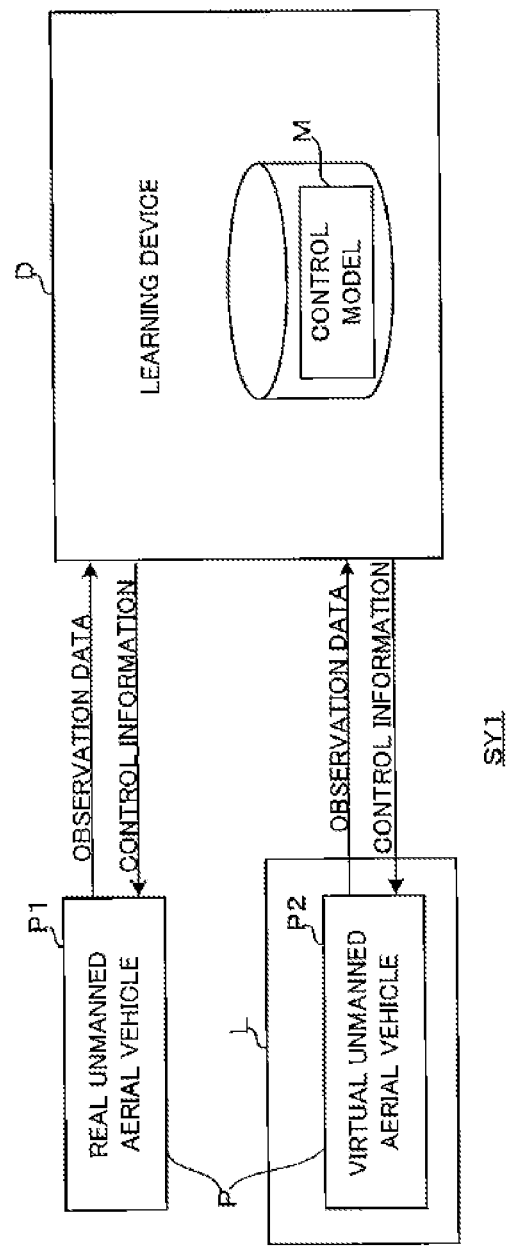
FIG. 2 is a diagram showing an outline configuration example of a learning system SY1 of a present embodiment.
Figure 3:
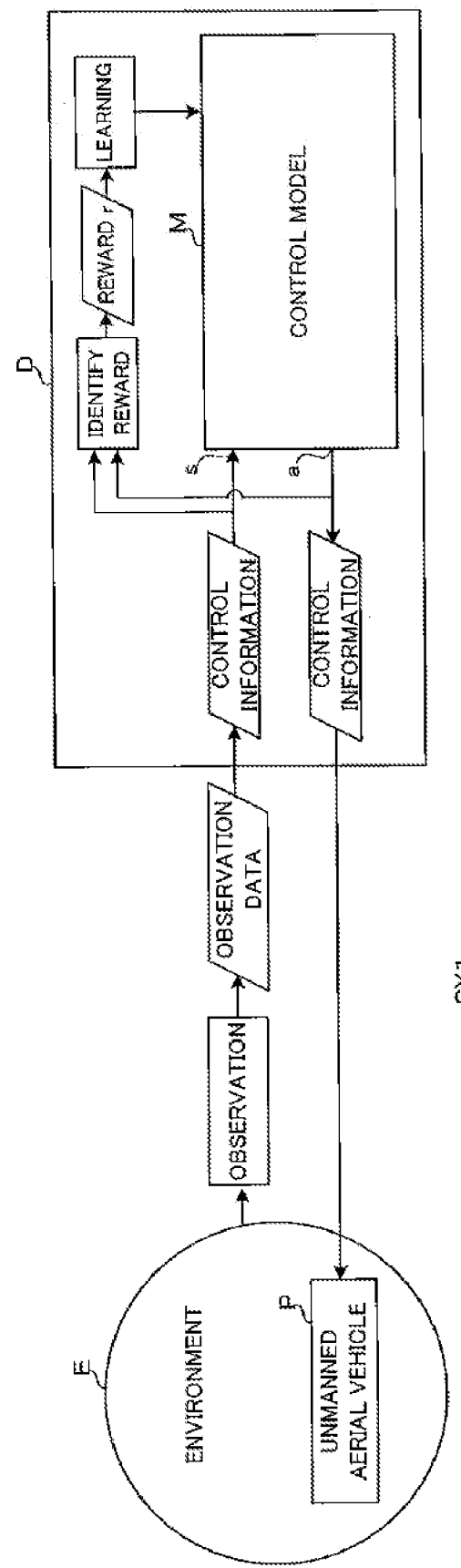
FIG. 3 is a conceptual diagram showing an example of reinforcement learning in the present embodiment.

Next, a configuration and a function outline of a learning system SY1 of the present embodiment will be described with reference to FIGS. 2 and 3. FIG. 2 is a diagram showing an outline configuration example of the learning system SY1 of the present embodiment. FIG. 3 is a conceptual diagram showing an example of reinforcement learning in the present embodiment. As shown in FIG. 2, the learning system SY1 includes a learning device D for performing reinforcement learning of a control model M. The control model M is a machine learning model for causing the learning device D (an example of a computer) to function so as to output control information for performing flight control of an unmanned aerial vehicle P based on environmental information on an environment E of at least one of the surrounding environment of the unmanned aerial vehicle P flying toward the destination and the environment of the planned flight area of the unmanned aerial vehicle P. Incidentally, the control model M is also called an action selection model.

Here, the surrounding environment of the unmanned aerial vehicle P means, for example, an environment within a specific range including the unmanned aerial vehicle P (for example, a range recognizable from the unmanned aerial vehicle P). On the other hand, the environment of the planned flight area of the unmanned aerial vehicle P means, for example, an environment within a specific range including the flight route planned by the unmanned aerial vehicle P (for example, a range recognizable from each point on the flight route). A part of the specific range including the unmanned aerial vehicle P may overlap with a part of the specific range including the flight route planned by the unmanned aerial vehicle P. Moreover, in the surrounding environment of the unmanned aerial vehicle P, a moving object of which position changes in time series may exist. The moving object of which position changes in time series means a moving object of which position changes with the passage of time (that is, a moving object that is moving). The moving object is different from the unmanned aerial vehicle P and is, for example, a human, an animal, a vehicle, a train, an aerial vehicle, a ship, or the like. The environmental information includes weather information in the environment E of the unmanned aerial vehicle P. The weather information includes at least one of wind information on wind, rainfall information on rainfall, snowfall information on snowfall, and lightning information on lightning. The wind information includes information on at least one of wind speed, wind direction, presence or absence of wind, presence or absence of strong wind, typhoon, and tornado.

As shown in FIG. 3, when the environmental information corresponding to observation data obtained by observing the environment E of the unmanned aerial vehicle P is input to the control model M as a state s of the environment E, control information for controlling the unmanned aerial vehicle P is output from the control model M. That is, the learning device D performs an operation based on a function constituting the control model M with respect to the input environmental information, and outputs control information as an action a from the control model M. Then, after the unmanned aerial vehicle P takes the action a based on the control information output from the control model M (that is, after the unmanned aerial vehicle P is controlled by the control information), the environmental information corresponding to the observation data obtained by observing the environment E of the unmanned aerial vehicle P is again input to the control model M. Here, when the unmanned aerial vehicle P takes the action a, the environmental information on the environment E may be changed. That is, the state s of the environment E of the unmanned aerial vehicle P may change.

The learning device D performs reinforcement learning of the control model M so as to output the control information that is expected to have a larger reward r (in other words, so as to obtain a larger reward r) based on the reward r obtained (that is, identified) when the unmanned aerial vehicle P existing in the environment E takes the action a based on the control information. Here, "state", "action", and "reward" are technical terms that can be clearly grasped by those skilled in the field of reinforcement learning. Incidentally, the reward r represents evaluation of the result of the action a (in other words, a score according to the result of the action). Examples of the reward r include a positive (plus) reward r and a negative (minus) reward r. The negative reward r is also called a penalty.

As the unmanned aerial vehicle P of the present embodiment, as shown in FIG. 2, at least one of a real unmanned aerial vehicle P1 that actually exists in a real environment and a virtual unmanned aerial vehicle P2 that virtually exists in a virtual environment is applied. When the real unmanned aerial vehicle P1 is applied, the learning system SY1 includes the real unmanned aerial vehicle P1. Here, a flight plan of the real unmanned aerial vehicle P1 is managed by, for example, a flight management system (not shown). The flight plan of the real unmanned aerial vehicle P1 includes a flight schedule from a departure point to a destination of the real unmanned aerial vehicle P1. The flight schedule includes information on a scheduled time (year, month, and day may be included as well as the time) when the real unmanned aerial vehicle P1 exists at at least one (that is, a predetermined point on a flight route) of the departure point, waypoint, and destination. At least one of the departure point, waypoint, and destination is, for example, a point on a map, represented by latitude and longitude. At this point, the real unmanned aerial vehicle P1 may be in the air (that is, in flight or hovering) or on the ground (that is, in landing). Information indicating the flight plan of the real unmanned aerial vehicle P1 is provided from the flight management system to the learning device D. Incidentally, the learning system SY1 may be provided inside or outside the flight management system.

On the other hand, when the virtual unmanned aerial vehicle P2 is applied, the learning system SY1 includes a simulator L. A flight plan of the virtual unmanned aerial vehicle P2 is managed by, for example, the simulator L. The details of the flight plan of the virtual unmanned aerial vehicle P2 are the same as those of the flight plan of the real unmanned aerial vehicle P1. The simulator L simulates a virtual environment. For example, the simulator L creates a virtual environment that includes the virtual unmanned aerial vehicle P2, the moving objects described above, stationary objects (for example, buildings, houses, walls, trees, etc.), and the ground surface (for example, numerous patterns of terrain), and updates the virtual environment according to the movement of at least one of the moving object and the virtual unmanned aerial vehicle P2. Information indicating the flight plan of the virtual unmanned aerial vehicle P2 is provided from the simulator L to the learning device D. Incidentally, since the generation and update processing of the virtual environment by the simulator L can be realized by using a known simulation technique, detailed description thereof will be omitted. The example of FIG. 2 shows an example in which the learning device D and the simulator L are different devices, but the learning device D may have the function of the simulator L. Moreover, the learning system SY1 may include both the real unmanned aerial vehicle P1 and the simulator L.

Observation data that is a source of the environmental information on the environment (in other words, the real environment) E of the real unmanned aerial vehicle P1 is provided in time series from the real unmanned aerial vehicle P1 to the learning device D. Then, the real unmanned aerial vehicle P1 is flight-controlled by a flight control unit of the real unmanned aerial vehicle P1 based on the control information provided in time series from the learning device D in response to the provision of the observation data. Incidentally, the flight control unit may be included in the learning device D. On the other hand, observation data that is a source of the environmental information on the environment (in other words, the virtual environment) E of the virtual unmanned aerial vehicle P2 is provided in time series from the simulator L to the learning device D. Then, the virtual unmanned aerial vehicle P2 is flight-controlled by the simulator L based on the control information provided in time series from the learning device D in response to the provision of the observation data.

Incidentally, "Provided in time series" means that it is continuously provided a plurality of times with the passage of time. A time interval at which the observation data or the control information is provided (that is, a provision interval) may be a regular interval or an irregular interval. Moreover, the control information includes, for example, at least one of a command for determining whether or not to travel the unmanned aerial vehicle P (in other words, whether or not to suspend (for example, hover) the unmanned aerial vehicle P), a command for determining a traveling direction (which direction to travel) when traveling the unmanned aerial vehicle P, a command for determining a speed mode (for example, acceleration, constant speed, or deceleration) when traveling the unmanned aerial vehicle P, a command for determining whether or not to change the altitude of the unmanned aerial vehicle P, a command for determining a direction of change (for example, ascending or descending) when changing the altitude of the unmanned aerial vehicle P, and a command for changing the attitude angle of the unmanned aerial vehicle P (how to tilt the airframe).

[3. Configuration and Function Outline of Real Unmanned Aerial Vehicle P1]

Figure 4:
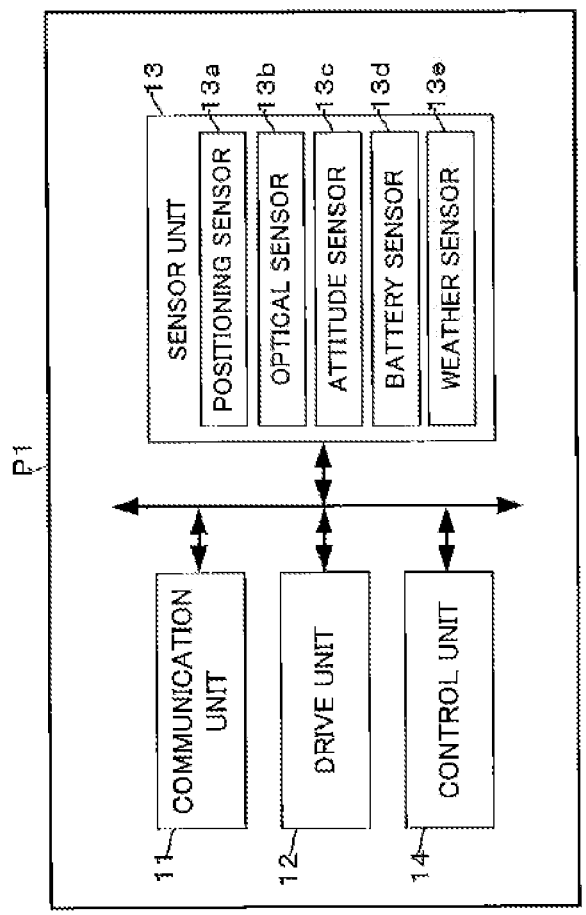
FIG. 4 is a diagram showing an outline configuration example of a real unmanned aerial vehicle P1.
Figure 5:
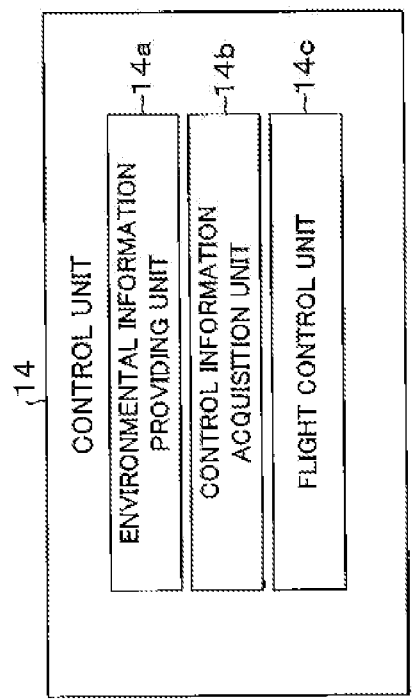
FIG. 5 is a diagram showing an example of functional blocks in a control unit 14.

Next, a configuration and a function outline of the real unmanned aerial vehicle P1 will be described with reference to FIGS. 4 and 5. FIG. 4 is a diagram showing an outline configuration example of the real unmanned aerial vehicle P1. As shown in FIG. 4, the real unmanned aerial vehicle P1 includes a communication unit 11, a drive unit (propulsion unit) 12, a sensor unit 13, a control unit 14, and the like. Incidentally, although not shown, the real unmanned aerial vehicle P1 includes a rotor (propeller) which is horizontal rotary wing and a battery which supplies electric power to each part of the real unmanned aerial vehicle P1. Moreover, the waterproof performance of the real unmanned aerial vehicle P1 varies depending on the model and specifications of the real unmanned aerial vehicle P1. That is, some real unmanned aerial vehicles P1 have high waterproof performance and others have low waterproof performance. The communication unit 11 is responsible for controlling communication with the learning device D via a communication network (not shown). The drive unit 12 rotates a plurality of rotors by a motor driven according to a control signal output from the control unit 14, a rotating shaft, and the like.

The sensor unit 13 includes a positioning sensor 13*a*, an optical sensor 13*b*, an attitude sensor 13*c*, a battery sensor 13*d*, a weather sensor 13*e*, and the like. These sensors are used for observing the surrounding environment of the real unmanned aerial vehicle P1. The positioning sensor 13*a* is a sensor for detecting a current position of the real unmanned aerial vehicle P1. For example, the positioning sensor 13*a* receives a radio wave transmitted from satellites of GNSS (Global Navigation Satellite System), and detects the current position (latitude and longitude) of the real unmanned aerial vehicle P1 in the horizontal direction based on the radio wave. Incidentally, the positioning sensor 13*a* may detect the current position (altitude) of the real unmanned aerial vehicle P1 in the vertical direction by an altitude sensor such as an atmospheric pressure sensor (not shown). The current position of the real unmanned aerial vehicle P1 is continuously detected a plurality of times with the passage of time (that is, detected in time series). A time interval at which the current position of the real unmanned aerial vehicle P1 is detected (that is, a detection interval) may be a regular interval or an irregular interval. Position information indicating the current position detected by the positioning sensor 13*a* is output to the control unit 14 in time series.

The optical sensor 13*b* is a sensor for optically non-contact sensing of the surrounding environment of the real unmanned aerial vehicle P1 from the sky. The optical sensor 13*b* uses, for example, a camera (for example, an RGB camera or an infrared camera). Incidentally, the optical sensor 13*b* may use a LiDAR (Light Detection and Ranging or Laser Imaging Detection and Ranging). The surrounding environment of the real unmanned aerial vehicle P1 is continuously sensed a plurality of times with the passage of time (that is, sensed without contact in time series). A time interval at which the surrounding environment of the real unmanned aerial vehicle P1 is sensed without contact (that is, a sensing interval) may be a regular interval or an irregular interval. Sensing data indicating the result of non-contact sensing by the optical sensor 13b (that is, sensing data obtained by non-contact sensing from the sky by the real unmanned aerial vehicle P1) is output to the control unit 14 in time series. The sensing data includes, for example, image data of the environment including moving objects, stationary objects, and the ground surface.

The attitude sensor 13c is a sensor for acquiring attitude data (including, for example, angular speed, and acceleration of the real unmanned aerial vehicle P1) relating to the attitude of the real unmanned aerial vehicle P1. The attitude sensor 13c uses, for example, a 3-axis angular speed sensor, a 3-axis acceleration sensor, and a 3-axis geomagnetic sensor. Incidentally, an IMU (Internal measurement unit) may be used in the attitude sensor 13c. Moreover, the attitude sensor 13c may acquire vibration data relating to vibration (differential absolute value of acceleration) of a housing of the real unmanned aerial vehicle P1. At least one of the attitude data and the vibration data of the real unmanned aerial vehicle P1 is continuously acquired a plurality of times with the passage of time (that is, acquired in time series). A time interval at which such data is acquired (that is, an acquisition interval) may be a regular interval or an irregular interval. At least one of the attitude data and the vibration data acquired by the attitude sensor 13c is output to the control unit 14 in time series.

The battery sensor 13d is a sensor for monitoring the remaining capacity or consumption of the battery of the real unmanned aerial vehicle P1. The remaining capacity or consumption of the battery is continuously detected a plurality times with the passage of time. A time interval at which the remaining capacity or consumption of the battery of the real unmanned aerial vehicle P1 is detected may be a regular interval or an irregular interval. Battery information indicating the remaining capacity or consumption of the battery detected by the battery sensor 13d is output to the control unit 14 in time series.

The weather sensor 13e is a sensor for measuring the weather such as presence or absence of wind (for example, presence or absence of strong wind), wind speed, wind direction, and rainfall (precipitation) in the surrounding environment of the real unmanned aerial vehicle P1. Weather is continuously measured a plurality of times with the passage of time. A time interval at which the weather is measured may be a regular interval or an irregular interval. Weather information indicating the weather measured by the weather sensor 13e (that is, weather information in the surrounding environment of the real unmanned aerial vehicle P1) is output to the control unit 14 in time series.

The control unit 14 includes a CPU (Central Processing Unit), which is a processor, a ROM (Read Only Memory), a RAM (Random Access Memory), a non-volatile memory, and the like. FIG. 5 is a diagram showing an example of functional blocks in the control unit 14. The control unit 14 functions as an environmental information providing unit 14a, a control information acquisition unit 14b, and a flight control unit 14c, as shown in FIG. 5, according to a program (program code group) stored in, for example, the ROM or the non-volatile memory. The environmental information providing unit 14a acquires position information, sensing data, attitude data, vibration data, battery information, and weather information from the sensor unit 13, and all or part of the position information, the sensing data, the attitude data, the vibration data, the battery information, and the weather information thus acquired are provided in time series as observation data to the learning device D via the communication unit 11.

Incidentally, the observation data may include time information indicating the current time. The current time may be acquired in time series by the control unit 14. Moreover, the observation data may include speed information indicating at least one of flight speed and flight acceleration of the real unmanned aerial vehicle P1. The flight speed and flight acceleration of the real unmanned aerial vehicle P1 may be calculated in time series by the control unit 14.

The control information acquisition unit 14b acquires the control information provided in time series from the learning device D via the communication unit 11. The flight control unit 14c performs flight control of the real unmanned aerial vehicle P1 based on the control information acquired in time series by the control information acquisition unit 14b. Such flight control includes control of the position, attitude and traveling direction of the real unmanned aerial vehicle P1. Incidentally, the flight control of the real unmanned aerial vehicle P1 may be said to be flight control by the learning system SY1 as a whole.

[4. Configuration and Function Outline of Learning Device D]

Figure 6:
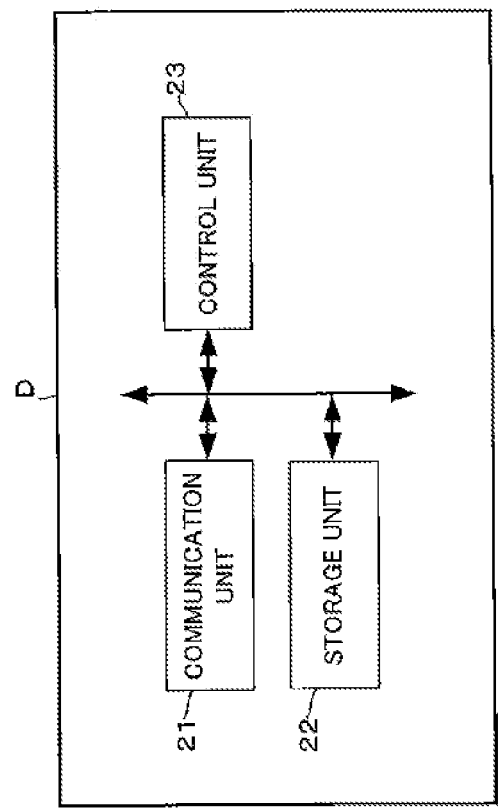
FIG. 6 is a diagram showing an outline configuration example of a learning device D.

Next, a configuration and a function outline of the learning device D will be described with reference to FIG. 6. FIG. 6 is a diagram showing an outline configuration example of the learning device D. As shown in FIG. 6, the learning device D includes a communication unit 21, a storage unit 22, a control unit 23, and the like. The communication unit 21 is responsible for controlling communication with at least one of the real unmanned aerial vehicle P1 and the simulator L via a communication network (not shown). The storage unit 22 includes, for example, a hard disk drive and the like. The storage unit 22 stores the control model M that inputs the environmental information and outputs the control information. Moreover, the storage unit 22 stores map data representing a map of a predetermined area including a planned flight area of the unmanned aerial vehicle P. The map data may include information such as static no-fly areas, stationary objects that can be obstacles, characteristics of the ground surface, and the like. Here, height information on the stationary objects is preferably included, and thus, the map data desirably represents a three-dimensional map.

Moreover, the storage unit 22 stores weather forecast map data representing a weather forecast map in the predetermined area including the planned flight area of the unmanned aerial vehicle P. The weather forecast map is a map showing weather information (that is, weather information in the predetermined area including the planned flight area of the unmanned aerial vehicle P) including at least one of wind information, rainfall information, snowfall information, and lightning information predicted in the predetermined area including the planned flight area, and may be, for example, a map for each predetermined unit time from the present to the future a predetermined time ahead. Examples of the map include a wind forecast map, a rainfall forecast map, a snowfall forecast map, and a lightning forecast map. Here, since the wind speed, the wind direction, and the like may greatly vary depending on the altitude, the wind forecast map may be divided into a plurality of parts according to the altitude. That is, the wind forecast map may be a four-dimensional map (four-dimensional array storing wind information for each of two horizontal directions× altitude×time zone). Incidentally, the weather forecast map data can be acquired from a weather observation server, a weather forecast server, or the like.

The control model M may be any machine learning model. For example, it is preferably a neural network composed of a plurality of layers including at least an input layer and an output layer, in which weighting coefficients of the plurality of layers are updated by reinforcement learning using the reward r. Here, an example of the "update" by reinforcement learning is "optimization". However, "optimization" is a technical term and is not necessarily optimal from all viewpoints, but may be more appropriate from a specific viewpoint. For example, an action value, a policy, a weighting coefficient, and the like, which will be described later, are updated so that more rewards r can be obtained.

Examples of learning algorithms for performing the reinforcement learning of the control model M include Q-Learning, DQN (Deep Q-Network), SARSA, A3C (Asynchronous Advantage Actor-Critic), UNREAL (UNsupervised REinforcement and Auxiliary Learning), Policy Gradient, TRPO (Trust Region Policy Optimization), PPO (Proximal Policy Optimization), and the like, but are not particularly limited. The learning algorithms can be broadly classified into value-based learning algorithms (for example, Q-Learning, DQN, SARSA, etc.) and policy-based learning algorithms (for example, Policy Gradient, TRPO, PPO, etc.). Either learning algorithms may be applied to this embodiment.

The value-based learning algorithm is a method for performing reinforcement learning of the control model M by updating (for example, optimizing) the action value (also called an action value function Q (s, a) or Q value) using the reward r. As a result, an optimum policy $\pi$ (that is, policy $\pi$ that optimizes the reward r) can be obtained. In the value-based learning algorithm, when environmental information is input to the control model M as the state s, the control model M outputs a plurality of action value functions Q (s, a) (that is, outputs a plurality of candidates) as the control information. Among the plurality of action value functions Q (s, a) thus output, the action a based on the control information corresponding to the action value function Q (s, a) having a relatively large (for example, the largest) value is selected.

Then, the action value function Q (s, a) is updated by using the reward r representing the evaluation of the result of the action a when the unmanned aerial vehicle P takes the selected action a. The reward r in this case is, for example, a sum of an instantaneous reward obtained when the action a is taken from the state s and a delayed reward (for example, delayed reward in consideration of a discount rate $\gamma$) obtained when, for example, an optimum action is continuously taken according to the policy $\pi$ from a state s+1 transitioned by the action a (transitioned with a certain transition probability). Here, the sum of the instantaneous reward and the delayed reward is preferably approximated as a discounted total reward based on the Bellman optimal equation. In this case, the action value function Q (s, a) is updated so that a difference (TD (Temporal Difference) error) between the action value function Q (s, a) before the update and the discounted total reward is minimized.

Incidentally, in the DQN modeled by a deep neural network, an approximation function Q (s, a; w) of the action value function Q (s, a) is output from the neural network. Here, w is a weighting coefficient for a plurality of layers of the neural network. Then, learning of the control model M is performed by updating (for example, optimizing) the weighting coefficient w so that an error function L, which is the square of the difference between the approximation function Q (s, a; w) and the discounted total reward, is minimized by a stochastic gradient descent method or the like.

On the other hand, the policy-based learning algorithm is a method for performing reinforcement learning of the control model M by updating (for example, optimizing) the policy $\pi$ (for example, a policy function $\pi_\theta$ (s) with $\theta$ as a parameter) using the reward r. In the policy-based learning algorithm, when environmental information is input to the control model M as the state s, the control model M outputs the action a or a probability distribution of the action a as the control information. Then, the policy $\pi$ is updated by using the reward r representing the evaluation of the result of the action a when the unmanned aerial vehicle P takes the output action a (or the action a selected based on the probability distribution). The reward r in this case is, for example, an expected cumulative reward J ($\theta$) obtained when, for example, an optimum action is continuously taken from the state s according to the policy $\pi$. In this case, the policy $\pi$ is updated so that the expected cumulative reward J ($\theta$) is maximized with respect to the policy $\pi$ by the stochastic gradient descent method or the like.

Figure 7:
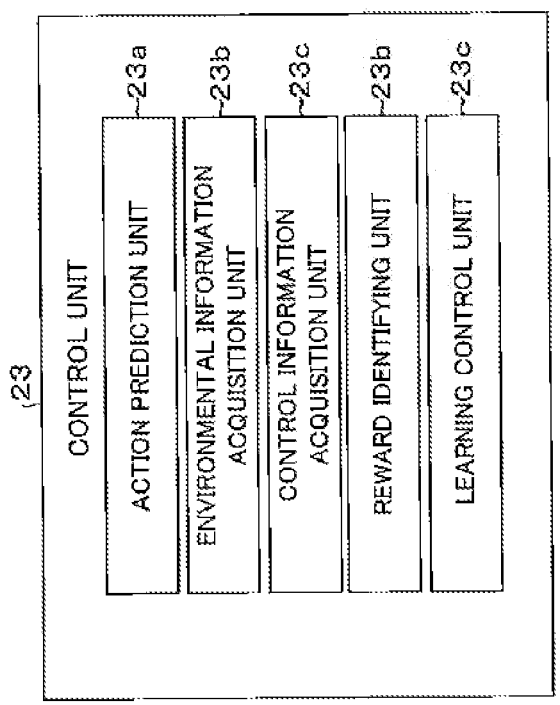
FIG. 7 is a diagram showing an example of functional blocks in a control unit 23.

The control unit 23 includes a CPU, which is a processor having an operation function, a ROM, a RAM, a non-volatile memory, and the like. FIG. 7 is a diagram showing an example of functional blocks in the control unit 23. The control unit 23 functions as an action prediction unit 23a, an environmental information acquisition unit 23b, a control information acquisition unit 23c, and a reward identifying unit 23d, a learning control unit 23e, and the like, as shown in FIG. 7, according to a program (program code group) stored in, for example, the ROM or the non-volatile memory.

The action prediction unit 23a predicts an action of a moving object existing in the surrounding environment of the real unmanned aerial vehicle P1 based on the observation data provided in time series from the real unmanned aerial vehicle P1, and obtains action prediction information on the predicted action (that is, action prediction information of the moving object). Alternatively, instead of (or in addition to) such action prediction information, the action prediction unit 23a may predict an action of a moving object existing in the surrounding environment of the virtual unmanned aerial vehicle P2 based on the observation data provided in time series from the simulator L, and obtain action prediction information on the predicted action. Here, the action prediction information includes, for example, a moving course (orbit) and a moving speed of the moving object. The moving course and moving speed of the moving object are acquired by tracking (for example, tracking only for a predetermined time) the moving object detected from the image (frames) included in each of the observation data acquired in time series. At this time, the type of the moving object (for example, a human, a vehicle, etc.) may be identified. Incidentally, the information items included in the observation data provided by the simulator L may be the same as or different from the information items (for example, position information, sensing data, attitude data, vibration data, battery information, weather information, time information, and speed information) included in the observation data provided by the real unmanned aerial vehicle P1.

Further, the action prediction unit 23a detects moving objects from the image included in the observation data, and may also estimate the characteristics of the ground surface (for example, sidewalks (walking paths), roadways (roads), railroad tracks, fields, buildings, rivers, seas, etc.) from the image included in the observation data. In this case, the action prediction unit 23a predicts the action of the moving object using the detected moving object and the estimated characteristics of the ground surface (hereinafter referred to as "ground surface characteristics"). Incidentally, for example, a known image recognition technique is used for estimating the ground surface characteristics. When a human moves, it is conceivable to move on the sidewalk as much as possible while avoiding obstacles such as vehicles. Moreover, when a vehicle moves, it is conceivable to move only on the roadway according to social norms such as traffic rules. That is, the action of the moving object depends on its surrounding environment. Therefore, by using the ground surface characteristics in the surrounding environment of the moving object, the action of the moving object can be predicted more accurately. When such ground surface characteristics can be identified from the map data stored in the storage unit 22, it is possible to omit the estimation of the ground surface characteristics. Incidentally, the moving speed of a moving object other than a human may be predicted in consideration of the moving speed estimated in the past, the shape of the roadway, and the like. At this time, if slope information of the roadway is obtained, the moving speed of the moving object may be predicted based on the slope information.

The environmental information acquisition unit 23*b* acquires the environmental information on the environment E of the real unmanned aerial vehicle P1 in time series based on at least one of the observation data provided in time series from the real unmanned aerial vehicle P1 and the weather forecast map data stored in the storage unit 22. Here, a time interval at which the environmental information is acquired (that is, an acquisition interval) may be a regular interval or an irregular interval. Alternatively, instead of (or in addition to) this environmental information, the environmental information acquisition unit 23*b* may acquire environmental information on the environment E of the virtual unmanned aerial vehicle P2 (that is, environmental information in the surrounding environment of the virtual unmanned aerial vehicle P2) in time series, based on the observation data provided by the simulator L. Incidentally, the environmental information may be the observation data itself provided by the real unmanned aerial vehicle P1 or the simulator L. In this case, the environmental information acquisition unit 23*b* acquires, for example, the weather information in the environment E of the unmanned aerial vehicle P (that is, the real unmanned aerial vehicle P1 or the virtual unmanned aerial vehicle P2) as the environmental information. Further, the environmental information acquisition unit 23*b* may acquire the position (or the position and attitude) of the unmanned aerial vehicle P, the remaining battery capacity (or the battery consumption) of the unmanned aerial vehicle P, the position of a moving object, and the position of a stationary object, and the terrain, as the environmental information. Further, the current time may be acquired as the environmental information. Moreover, at least one of the flight speed and flight acceleration of the unmanned aerial vehicle P may be acquired as the environmental information.

Moreover, the environmental information acquisition unit 23*b* may acquire the ground surface characteristics as the environmental information by estimating the ground surface characteristics in the environment E based on the above observation data. Further, the environmental information acquisition unit 23*b* may acquire the position information (in other words, the range information) of a no-fly zone (static no-fly zone) predetermined in the environment E as the environmental information. For example, the sky above the ground surface having predetermined characteristics or a stationary object may be set as a static no-fly zone, or an area within a predetermined distance (for example, 30 m) from the ground surface having predetermined characteristics or a stationary object may be set as a static no-fly zone. Incidentally, the position information of the static no-fly zone may be acquired from the map data, for example.

Alternatively, the environmental information may include the action prediction information acquired from the action prediction unit 23*a* (that is, the action prediction information of the moving object of which action is predicted by the action prediction unit 23*a*), in addition to at least one of the observation data provided in time series from the real unmanned aerial vehicle P1 or the simulator L and the weather forecast map data stored in the storage unit 22. Learning efficiency can be improved by using such action prediction information as the environmental information. In this case, the environmental information acquisition unit 23*b* acquires, for example, the moving course and moving speed of the moving object, in addition to the weather information in the environment E of the unmanned aerial vehicle P, the position (or the position and attitude) of the unmanned aerial vehicle P in the environment E, the remaining battery capacity (or the battery consumption) of the unmanned aerial vehicle P, the position of the moving object, and the position of the stationary object, the ground surface characteristics, the terrain, and the like, as the environmental information. Incidentally, the environmental information may be information that has been converted (for example, subjected to preprocessing such as file format changing or data shaping) so that at least one of the observation data provided by the real unmanned aerial vehicle P1 or the simulator L and the weather forecast map data stored in the storage unit 22 (or the data and the action prediction information) is easily processed by the control information acquisition unit 23*c* or the reward identifying unit 23*d*.

Alternatively, the environmental information acquisition unit 23*b* may acquire the environmental information in time series by performing predetermined information processing based on the observation data provided in time series from the real unmanned aerial vehicle P1 or the simulator L. This information processing may include, for example, a SLAM (Simultaneous Localization and Mapping) process. In this case, the environmental information acquisition unit 23*b* estimates the position and attitude of the unmanned aerial vehicle P in the surrounding environment based on the observation data acquired in time series in the SLAM process, and also creates a three-dimensional map of the surrounding environment (for example, a three-dimensional map that reflects weather information such as wind information and the like). Incidentally, in order to improve the accuracy of SLAM, it is preferable that the moving object is masked on the image included in the observation data (that is, the information of the moving object is removed from the observation data) and then the SLAM process is performed. Further, the environmental information acquisition unit 23*b* acquires the action prediction information of the moving object (that is, the position, moving course, and moving speed of the moving object in the surrounding environment) from the action prediction unit 23*a*.

Then, the environmental information acquisition unit 23*b* acquires the environmental information in time series by integrating the position and attitude of the unmanned aerial vehicle P and the action prediction information of the moving object (that is, the position, moving course, and moving speed of the moving object in the surrounding environment) into the three-dimensional map created above (that is, reflecting the information on the moving object and the like). The environmental information thus acquired in time series is composed of a plurality of continuous three-dimensional map images, that is, a moving image of the three-dimensional map. At least the position of the moving object changes on the moving image. Incidentally, in the above information processing, the environmental information acquisition unit 23b may estimate the ground surface characteristics in the surrounding environment on the basis of the observation data. In this case, in addition to the position and attitude of the unmanned aerial vehicle P and the action prediction information of the moving object, the ground surface characteristics are integrated into the created three-dimensional map to thereby acquire the environmental information. Further, the environmental information may be acquired by integrating, in addition to the position and attitude of the unmanned aerial vehicle P, at least one of the flight speed and flight acceleration of the unmanned aerial vehicle P into the above created three-dimensional map.

The control information acquisition unit 23c inputs the environmental information acquired by the environmental information acquisition unit 23b to the control model M as the state s, to thereby acquire the control information output from the control model M. Here, the environmental information is continuously input to the control model M a plurality of times with the passage of time (that is, input in time series). A time interval at which the environmental information is input (that is, an input interval) may be a regular interval or an irregular interval. In one input to the control model M, for example, at least the position of the unmanned aerial vehicle P (variable×1) and the weather information in the environment E (variable×2) are input as the environmental information. In addition to these, at least one of the information including the attitude of the unmanned aerial vehicle P (variable×3), the vibration of the housing of the unmanned aerial vehicle P (variable×4), the remaining battery capacity (or the battery consumption) of the unmanned aerial vehicle P (variable×5), the position of an obstacle (at least one of a moving object and a stationary object) (variable×6), the ground surface characteristics (variable×7), the terrain (variable×8), the moving course of the moving object (variable×9), and the moving speed (variable×10) is configured to be input as the environmental information, so that learning accuracy can be improved.

Moreover, when the environmental information is a three-dimensional map in which information such as the position of a moving object is integrated, for example, a value of each voxel constituting the image of the three-dimensional map is input in one input to the control model M. Incidentally, when the three-dimensional map input as the environmental information is configured to be a three-dimensional map in which the weather information in the environment E, the action prediction information of the moving object, and the ground surface characteristics are integrated, the learning accuracy can be improved. However, not a three-dimensional map, but a simulation image formed by CG (Computer Graphics) that reproduces, for example, humans, vehicles, buildings, roads, and the like may be input to the control model M. In order to improve the learning accuracy, it is desirable to perform simulations of sufficient variations (types of vehicles, shapes of roads or buildings, colors, types of human head, etc.) and reinforcement learning based on them.

Then, the control information acquisition unit 23c provides the control information acquired from the control model M to the real unmanned aerial vehicle P1 or the simulator L in time series via the communication unit 21. Here, the control information may be provided to the real unmanned aerial vehicle P1 or the simulator L each time it is output from the control model M. Alternatively, the control information output from the control model M may be provided to the real unmanned aerial vehicle P1 or the simulator L at an interval longer than the output interval (that is, the output control information may be thinned out).

The reward identifying unit 23d identifies the reward r representing the evaluation of the result of the action a when the unmanned aerial vehicle P takes the action a based on the control information. For identifying the reward r, for example, a reward table prepared in advance or a reward calculation formula may be used. The reward table is a table in which rewards are associated with state information representing each of a plurality of states. According to the reward table, the reward r associated with the state information representing the state s+1 transitioned when the unmanned aerial vehicle P takes the action a in the state s is identified. However, the reward table may be a table in which rewards are associated with each of a plurality of pairs of the state s and the action a when the action a is taken in the state s. On the other hand, the reward calculation formula is a formula for calculating the reward by substituting the state information representing the state. According to the reward calculation formula, the reward r is identified by substituting the state information representing the state s+1 transitioned when the unmanned aerial vehicle P takes the action a in the state s. Incidentally, the state information is identified, for example, based on the environmental information input to the control model M and the control information output from the control model M by inputting the environmental information.

Here, examples of the state information representing the state include (i) the attitude of the unmanned aerial vehicle P, (ii) flight stability of the unmanned aerial vehicle P, (iii) the altitude of the unmanned aerial vehicle P, (iv) a relationship between accumulated precipitation on the unmanned aerial vehicle P and waterproof performance of the unmanned aerial vehicle P, (v) a positional relationship between the unmanned aerial vehicle P and an obstacle, (vi) a positional relationship between the unmanned aerial vehicle P and a no-fly zone, (vii) the remaining battery capacity of the unmanned aerial vehicle P, (viii) the ground surface characteristics in the surrounding environment of the unmanned aerial vehicle P, (ix) a state of whether or not the unmanned aerial vehicle P has reached a predetermined point (hereinafter referred to as "reached/unreached state"), (x) a moving state of the unmanned aerial vehicle P, and the like. The reward identifying unit 23d identifies the reward r according to these state information (that is, the reward r that varies depending on the state information). Hereinafter, specific examples of the rewards r according to the state information will be described.

(i) Reward r According to Attitude of Unmanned Aerial Vehicle P

In this case, based on the environmental information input to the control model M and the control information output from the control model M by inputting the environmental information, the reward identifying unit 23d identifies the attitude of the unmanned aerial vehicle P (an example of the state information) when the unmanned aerial vehicle P takes the action a based on the control information. That is, the attitude of the unmanned aerial vehicle P after the transition from the state s by the action a is identified. The attitude of the unmanned aerial vehicle P can be identified, for example, by an attitude angle indicating by how many degrees the unmanned aerial vehicle P is tilted from a state horizontal to the ground. The attitude angle is, for example, a roll angle (tilting left and right) or a pitch angle (tilting back and forth).

Then, the reward identifying unit 23d identifies the reward r from the attitude of the unmanned aerial vehicle P, for example, using the reward table or the reward calculation formula. That is, the reward identifying unit 23d identifies the reward r that varies depending on the attitude of the unmanned aerial vehicle P when the unmanned aerial vehicle P takes the action a. For example, a larger attitude angle (that is, a larger tilt) of the unmanned aerial vehicle P identifies a smaller reward r (in other words, a smaller attitude angle identifies a larger reward r). With such a reward r, the control model M can be learned so as to output control information for causing the unmanned aerial vehicle P to perform a flight that keeps the attitude of the unmanned aerial vehicle P stable even under the influence in particular of the weather.

Moreover, for example, when the unmanned aerial vehicle P tilts at a first threshold value (for example, 30°) or more, a negative reward r (for example, r=−2) is identified because the risk of capsizing increases, and further, when the unmanned aerial vehicle P tilts at a second threshold value (for example, 45°) or more, a smaller negative reward r (for example, r=−7) may be identified because it is considered that the unmanned aerial vehicle P has been capsized. In this case, the reward r may be designed to monotonically decrease (for example, as −3, −4, −5, −6) between the first threshold value (for example, 30°) and the second threshold value (for example, 45°), according to the attitude angle (the absolute value of the reward r monotonically increases). Incidentally, the threshold value of the attitude angle may be appropriately designed according to the type and performance of the unmanned aerial vehicle P. For example, some airframes move while maintaining an attitude angle of about 10°; others fly at an attitude angle close to vertical.

(ii) Reward r According to Flight Stability of Unmanned Aerial Vehicle P

In this case, based on the environmental information input to the control model M and the control information output from the control model M by inputting the environmental information, the reward identifying unit 23d identifies the flight stability of the unmanned aerial vehicle P (an example of the state information) when the unmanned aerial vehicle P takes the action a based on the control information. That is, the flight stability of the unmanned aerial vehicle P after the transition from the state s by the action a is identified. The flight stability of the unmanned aerial vehicle P is evaluated based on the vibration of the unmanned aerial vehicle P (vibration of the housing). For example, the greater the vibration of the unmanned aerial vehicle P, the lower the flight stability.

Then, the reward identifying unit 23d identifies the reward r from the flight stability of the unmanned aerial vehicle P, for example, using the reward table or the reward calculation formula. That is, the reward identifying unit 23d identifies the reward r that varies depending on the flight stability of the unmanned aerial vehicle P when the unmanned aerial vehicle P takes the action a. For example, a lower flight stability (that is, a larger vibration of the housing) of the unmanned aerial vehicle P identifies a smaller reward r (for example, a negative reward r) (in other words, a higher flight stability identifies a larger reward r). With such a reward r, the control model M can be learned so as to output control information for causing the unmanned aerial vehicle P to fly with high flight stability even under the influence in particular of the weather. Incidentally, when the vibration of the unmanned aerial vehicle P is large, not only the flight stability but also an adverse effect on various devices in the unmanned aerial vehicle P is considered, and Moreover when the unmanned aerial vehicle P is carrying cargo, an adverse effect (impact) on the cargo is also considered. Therefore, when the flight stability of the unmanned aerial vehicle P is lower than the threshold value, a negative reward r is preferably identified.

(iii) Reward r According to Altitude of Unmanned Aerial Vehicle P

In this case, based on the environmental information input to the control model M and the control information output from the control model M by inputting the environmental information, the reward identifying unit 23d identifies the altitude of the unmanned aerial vehicle P (an example of the state information) when the unmanned aerial vehicle P takes the action a based on the control information. That is, the altitude of the unmanned aerial vehicle P after the transition from the state s by the action a is identified. Incidentally, the altitude of the unmanned aerial vehicle P may be a distance from the position of the unmanned aerial vehicle P in the air to the ground (that is, the ground in the vertical direction from the unmanned aerial vehicle P). Moreover, when there is an obstacle on the ground, the altitude thereof may be a distance from the position of the unmanned aerial vehicle P to the obstacle. These distances (that is, the distances in three-dimensional space) are obtained from the sensing data that has been obtained by non-contact sensing by the optical sensor 13b provided in the unmanned aerial vehicle P. However, the altitude of the unmanned aerial vehicle P may be an altitude (that is, an elevation) according to the atmospheric pressure detected by the atmospheric pressure sensor provided in the unmanned aerial vehicle P.

Then, the reward identifying unit 23d identifies the reward r from the altitude of the unmanned aerial vehicle P, for example, using the reward table or the reward calculation formula. That is, the reward identifying unit 23d identifies the reward r that varies depending on the altitude of the unmanned aerial vehicle P when the unmanned aerial vehicle P takes the action a. For example, a lower altitude of the unmanned aerial vehicle P identifies a smaller reward r (for example, a negative reward r) (in other words, a higher altitude identifies a larger reward r). This is because an excessively low altitude increases the risk of contact with the obstacle. Alternatively, a higher altitude of the unmanned aerial vehicle P may identify a smaller reward r (for example, a negative reward r). This is because an excessively high altitude increases the risk of overlapping the airspace of a manned aerial vehicle. With such a reward r, the control model M can be learned so as to output control information for causing the the unmanned aerial vehicle P to perform a flight that keeps the altitude of the unmanned aerial vehicle P safe even under the influence in particular of the weather.

Moreover, the reward identifying unit 23d may identify the reward r that varies depending on whether or not the altitude of the unmanned aerial vehicle P is included in a specific altitude range (for example, 30 m to 150 m from the ground) when the unmanned aerial vehicle P takes the action a. For example, when the altitude of the unmanned aerial vehicle P is not included within the specific altitude range, a small reward r (for example, negative reward r=−2)) is identified, and when it is included within such altitude range, a large reward r is identified. As a result, the control model M can be learned so as to output control information for causing the unmanned aerial vehicle P to perform a flight that keeps the altitude of the unmanned aerial vehicle P within the specific altitude range even under the influence in particular of the weather. Incidentally, the specific altitude range is, for example, a range stipulated by laws and regulations.

Moreover, the specific altitude range may dynamically change based on the sensing data obtained by non-contact sensing from the sky by the unmanned aerial vehicle P. For example, when no obstacle is identified directly under or around the unmanned aerial vehicle P based on the sensing data, the altitude range is set to, for example, G m to 150 m from the ground. On the other hand, when an obstacle is identified directly under or around the unmanned aerial vehicle P, the altitude range is set to, for example, 30 m to 150 m from the ground. Here, the lower limit of the altitude range may be changed according to the height of the obstacle (that is, the higher the obstacle, the larger the lower limit).

(iv) Reward r According to Relationship Between Accumulated Precipitation on Unmanned Aerial Vehicle P and Waterproof Performance of Unmanned Aerial Vehicle P In this case, based on the environmental information input to the control model M and the control information output from the control model M by inputting the environmental information, the reward identifying unit 23d identifies the accumulated precipitation on the unmanned aerial vehicle P and a threshold value according to the waterproof performance of the unmanned aerial vehicle P when the unmanned aerial vehicle P takes the action a based on the control information. That is, the accumulated precipitation on the unmanned aerial vehicle P and the threshold value according to the waterproof performance of the unmanned aerial vehicle P after the transition from the state s by the action a are identified. Here, the threshold value according to the waterproof performance of the unmanned aerial vehicle P is identified by, for example, the model and specifications of the unmanned aerial vehicle P.

Subsequently, the reward identifying unit 23d identifies the relationship between the accumulated precipitation and the waterproof performance of the unmanned aerial vehicle P (an example of the state information) based on the accumulated precipitation on the unmanned aerial vehicle P and the threshold value according to the waterproof performance of the unmanned aerial vehicle P, both identified above. Here, the relationship between the accumulated precipitation and the waterproof performance of the unmanned aerial vehicle P is, for example, a magnitude relationship between the accumulated precipitation on the unmanned aerial vehicle P and the threshold value according to the waterproof performance of the unmanned aerial vehicle P.

Then, the reward identifying unit 23d identifies the reward r from the relationship between the accumulated precipitation on the unmanned aerial vehicle P and the threshold value according to the waterproof performance of the unmanned aerial vehicle P, for example, using the reward table or the reward calculation formula. That is, the reward identifying unit 23d identifies the reward r that varies depending on the relationship between the accumulated precipitation on the unmanned aerial vehicle P and the threshold value according to the waterproof performance of the unmanned aerial vehicle P when the unmanned aerial vehicle P takes the action a. For example, when the accumulated precipitation on the unmanned aerial vehicle P exceeds the threshold value according to the waterproof performance of the unmanned aerial vehicle P, a small reward r (for example, negative reward r=−5) is identified. With such a reward r, the control model M can be learned so as to output control information for causing the unmanned aerial vehicle P to fly without affecting the waterproof performance of the unmanned aerial vehicle P even under the influence in particular of the rainfall. Incidentally, for example, when the accumulated precipitation on the unmanned aerial vehicle P exceeds the threshold value according to the waterproof performance of the unmanned aerial vehicle P, a larger difference between the accumulated precipitation and the threshold value may identify a smaller reward r.

(v) Reward r According to Positional Relationship Between Unmanned Aerial Vehicle P and Obstacle In this case, based on the environmental information input to the control model M and the control information output from the control model M by inputting the environmental information, the reward identifying unit 23d identifies the position of the unmanned aerial vehicle P and the position of an obstacle (at least one of a moving object and a stationary object) when the unmanned aerial vehicle P takes the action a based on the control information. That is, the position of the unmanned aerial vehicle P and the position of the obstacle after the transition from the state s by the action a are identified.

Subsequently, the reward identifying unit 23d identifies the positional relationship between the unmanned aerial vehicle P and the obstacle (an example of the state information) based on the position of the unmanned aerial vehicle P and the position of the obstacle, both identified above. Here, the positional relationship between the unmanned aerial vehicle P and the obstacle is, for example, information indicating at least one of the distance between the unmanned aerial vehicle P and the obstacle and the direction of the obstacle with the unmanned aerial vehicle P as a viewpoint. Incidentally, the distance between the unmanned aerial vehicle P and the obstacle may be a distance in a three-dimensional space considering the altitude (that is, the height direction), or a two-dimensional distance ignoring the altitude. Similarly, the direction of the obstacle with the unmanned aerial vehicle P as a viewpoint may be a direction in a three-dimensional space considering the altitude, or a two-dimensional direction ignoring the altitude.

Then, the reward identifying unit 23d identifies the reward r from the positional relationship between the unmanned aerial vehicle P and the obstacle, for example, using the reward table or the reward calculation formula. That is, the reward identifying unit 23d identifies the reward r that varies depending on the positional relationship between the unmanned aerial vehicle P and the obstacle when the unmanned aerial vehicle P takes the action a. For example, a shorter distance between the unmanned aerial vehicle P and the obstacle identifies a smaller reward r (in other words, a longer distance identifies a larger reward r). With such a reward r, the control model M can be learned so as to output control information for causing the unmanned aerial vehicle P to fly so as to avoid approaching or contacting the obstacle due to the influence in particular of the weather (for example, due to the unmanned aerial vehicle P being swept by the wind). Incidentally, when the distance between the unmanned aerial vehicle P and the obstacle is less than or equal to the threshold value (that is, when the obstacle exists within a predetermined distance from the unmanned aerial vehicle P), a negative reward r may be identified. Moreover, when the unmanned aerial vehicle P comes into contact with the obstacle, the smallest negative reward r may be identified.

Alternatively, a smaller angle difference between the direction of the obstacle with the unmanned aerial vehicle P as a viewpoint and the traveling direction of the unmanned aerial vehicle P (for example, the direction to the destination) identifies a smaller reward r (in other words, a larger angle difference identifies a larger reward r). In this case, there may be identified the reward r that varies depending on the distance between the unmanned aerial vehicle P and the obstacle, in addition to the angle difference between the two directions. Moreover, when the angle difference between the direction of the obstacle with the unmanned aerial vehicle P as a viewpoint and the traveling direction of the unmanned aerial vehicle P is less than or equal to the threshold value, a negative reward r may be identified. Incidentally, the positional relationship between the unmanned aerial vehicle P and the obstacle may be, for example, information indicating whether or not the unmanned aerial vehicle P exists in the sky above the obstacle. In this case, for example, a negative reward r may be identified when the unmanned aerial vehicle P exists above the obstacle.

(vi) Reward r According to Positional Relationship Between Unmanned Aerial Vehicle P and No-Fly Zone In this case, based on the environmental information input to the control model M and the control information output from the control model M by inputting the environmental information, the reward identifying unit 23d identifies the position of the unmanned aerial vehicle P and the range of the no-fly zone when the unmanned aerial vehicle P takes the action a based on the control information. That is, the position of the unmanned aerial vehicle P and the range of the no-fly zone after the transition from the state s by the action a are identified. Here, as an example of the no-fly zone, there are a predetermined static no-fly zone and a dynamic no-fly zone set according to the movement of a moving object. In the latter case, the sky above the moving object may be set as the dynamic no-fly zone, or a predetermined distance (for example, 30 m) or less from the moving object may be set as the dynamic no-fly zone.

Subsequently, the reward identifying unit 23d identifies the positional relationship between the unmanned aerial vehicle P and the no-fly zone (an example of the state information) based on the position of the unmanned aerial vehicle P and the range of the no-fly zone, both identified above. Here, the positional relationship between the unmanned aerial vehicle P and the no-fly zone is, for example, information indicating at least one of the distance between the unmanned aerial vehicle P and the no-fly zone and the direction of the no-fly zone with the unmanned aerial vehicle P as a viewpoint. Incidentally, the distance between the unmanned aerial vehicle P and the no-fly zone may be a distance in a three-dimensional space considering the altitude, or a two-dimensional distance ignoring the altitude. Similarly, the direction of the no-fly zone with the unmanned aerial vehicle P as a viewpoint may be a direction in a three-dimensional space considering the altitude, or a two-dimensional direction ignoring the altitude.

Then, the reward identifying unit 23d identifies the reward r from the positional relationship between the unmanned aerial vehicle P and the no-fly zone, for example, using the reward table or the reward calculation formula. That is, the reward identifying unit 23d identifies the reward r that varies depending on the positional relationship between the unmanned aerial vehicle P and the no-fly zone when the unmanned aerial vehicle P takes the action a. For example, a shorter distance between the unmanned aerial vehicle P and the no-fly zone identifies a smaller reward r. With such a reward r, the control model M can be learned so as to output control information for causing the unmanned aerial vehicle P to fly so as to avoid approaching or entering the no-fly zone due to the influence in particular of the weather, for example, due to the unmanned aerial vehicle P being swept by the wind. Incidentally, when the distance between the unmanned aerial vehicle P and the no-fly zone is less than or equal to the threshold value, a negative reward r may be identified. Moreover, when the unmanned aerial vehicle P enters the no-fly zone, a negative reward r may be identified.

Alternatively, a smaller angle difference between the direction of the no-fly zone with the unmanned aerial vehicle P as a viewpoint and the traveling direction of the unmanned aerial vehicle P (for example, the direction to the destination) identifies a smaller reward r. In this case, there may be identified the reward r that varies depending on the distance between the unmanned aerial vehicle P and the no-fly zone, in addition to the angle difference between the two directions. Moreover, when the angle difference between the direction of the no-fly zone with the unmanned aerial vehicle P as a viewpoint and the traveling direction of the unmanned aerial vehicle P is less than or equal to the threshold value, a negative reward r may be identified. Incidentally, the positional relationship between the unmanned aerial vehicle P and the no-fly zone may be, for example, information indicating whether or not the unmanned aerial vehicle P stays in the no-fly zone. In this case, for example, a negative reward r may be identified when the unmanned aerial vehicle P stays in the no-fly zone.

Moreover, the reward identifying unit 23d identifies the reward r when the unmanned aerial vehicle P stays in the dynamic no-fly zone so as to be the same as or different from the reward r when the unmanned aerial vehicle P stays in the static no-fly zone. In the latter case, for example, the reward r when the unmanned aerial vehicle P stays in the dynamic no-fly zone is preferably identified to be less than the reward r when the unmanned aerial vehicle P stays in the static no-fly zone.

(vii) Reward r According to Remaining Battery Capacity of Unmanned Aerial Vehicle P In this case, on the basis of the environmental information input to the control model M and the control information output from the control model M by inputting the environmental information, the reward identifying unit 23d identifies the remaining battery capacity of the unmanned aerial vehicle P (an example of the state information) when the unmanned aerial vehicle P takes the action based on the control information. That is, the remaining battery capacity of the unmanned aerial vehicle P after the transition from the state s by the action a is identified. Incidentally, instead of the remaining battery capacity of the unmanned aerial vehicle P, the battery consumption may be identified.

Then, the reward identifying unit 23d identifies the reward r from the remaining battery capacity (or the battery consumption), for example, using the reward table or the reward calculation formula. That is, the reward identifying unit 23d identifies the reward r that varies depending on the remaining battery capacity (or the battery consumption) when the unmanned aerial vehicle P takes the action a. For example, a lower remaining battery capacity (or a higher battery consumption) identifies a smaller reward r. With such a reward r, the control model M can be learned so as to output control information for causing the unmanned aerial vehicle P to fly with more remaining battery capacity (or with less battery consumption) even under the influence in particular of the weather. Incidentally, when the remaining battery capacity is less than or equal to the threshold value (or the battery consumption is more than or equal to the threshold value), a negative reward r may be identified.

(viii) Reward r According to Ground Surface Characteristics in Environment E of Unmanned Aerial Vehicle P In this case, on the basis of the environmental information input to the control model M and the control information output from the control model M by inputting the environmental information, the reward identifying unit 23d identifies the ground surface characteristics in the environment E of the unmanned aerial vehicle P (an example of the state information) when the unmanned aerial vehicle P takes the action based on the control information. That is, the ground surface characteristics in the environment E of the unmanned aerial vehicle P after the transition from the state s by the action a are identified.

Then, the reward identifying unit 23d identifies the reward r from the ground surface characteristics in the environment E of the unmanned aerial vehicle P, for example, using the reward table or the reward calculation formula. That is, the reward identifying unit 23d identifies the reward r that varies depending on the ground surface characteristics in the environment E of the unmanned aerial vehicle P when the unmanned aerial vehicle P takes the action a. Here, the ground surface characteristics in the environment E of the unmanned aerial vehicle P may be the ground surface characteristics in a specific area including a horizontal position of the unmanned aerial vehicle P.

For example, the ground surface characteristics such as roads and railroad tracks have a higher probability of allowing moving objects to pass than other ground surface characteristics, so flight over roads and railroad tracks or over a specific area within a predetermined distance from the road or railroad track is not recommended. However, depending on the destination, it may be unavoidable to fly over the specific area. Therefore, it is preferable that the specific area is dynamically set as a flight non-recommended area. Then, when the unmanned aerial vehicle P stays in the flight non-recommended area, a negative reward r is preferably identified. However, the reward r (for example, r=−1) when the unmanned aerial vehicle P stays in the flight non-recommended area is desirably larger than the reward r (for example, r=−5) when the unmanned aerial vehicle P stays in the no-fly zone. With such a reward r, the control model M can be learned so as to output control information for causing the unmanned aerial vehicle P to fly according to the ground surface characteristics (for example, to fly while reducing the flight non-recommended area as much as possible) even under the influence in particular of the weather.

(ix) Reward r According to Reached/Unreached State of Unmanned Aerial Vehicle P

In this case, on the basis of the environmental information input to the control model M and the control information output from the control model M by inputting the environmental information, the reward identifying unit 23d identifies the reached/unreached state of whether or not the unmanned aerial vehicle P has reached a predetermined point (an example of the state information) when the unmanned aerial vehicle P takes the action based on the control information. That is, the reached/unreached state of the unmanned aerial vehicle P after the transition from the state s by the action a is identified. Incidentally, the position of the predetermined point can be acquired from, for example, the flight plan described above.

Then, the reward identifying unit 23d identifies the reward r from the reached/unreached state of the unmanned aerial vehicle P, for example, using the reward table or the reward calculation formula. That is, the reward identifying unit 23d identifies the reward r that varies depending on whether or not the unmanned aerial vehicle P has reached the predetermined point when the unmanned aerial vehicle P takes the action a. For example, when the unmanned aerial vehicle P has reached the predetermined point, a positive reward r (for example, r=100) is identified. On the other hand, when the unmanned aerial vehicle P has not reached the predetermined point, a zero reward r (for example, r=0) is preferably identified. As a result, the control model M can be learned so as to output control information for causing the unmanned aerial vehicle P to fly so as to appropriately reach the predetermined point.

Further, when the unmanned aerial vehicle P takes the action a, the reward identifying unit 23d may identify the reward r that varies depending on at least one of the required flight time and the battery consumption at the time when the unmanned aerial vehicle P reaches a predetermined point. For example, the reward r according to both the required flight time and the battery consumption can be identified by the following equation (1).

$$r = X - f(t) - g(b) \tag{1}$$

Here, X is a reference reward in the case of reaching (arriving at) a predetermined point (for example, a destination), and is a predetermined positive value (for example, +100 points). f(t) is a function of a required flight time t. The required flight time t is the time required from the start of flight of the unmanned aerial vehicle P to the arrival at a predetermined point, and can be calculated based on the current time included in the environmental information. f(t) is, for example, a monotonically increasing function that outputs a larger value as the required flight time t becomes longer. As a result, a shorter required flight time t identifies a larger reward r. With such a reward r, the control model M can be learned so as to output control information for causing the unmanned aerial vehicle P to fly so as to shorten the required flight time t as much as possible even under the influence in particular of the weather.

Alternatively, f(t) may be a function that outputs a larger value as the difference between the required flight time t and a target required time (planned flight time) becomes larger. As a result, a larger reward r is identified by flying according to the target required time. With such a reward r, the control model M can be learned so as to output control information for causing the unmanned aerial vehicle P to fly so as to approximate the required flight time t as much as possible to the target required time even under the influence in particular of the weather. Incidentally, the target required time can be acquired from, for example, the flight plan described above.

Moreover, g(b) is a function of a battery consumption b. g(b) is, for example, a monotonically increasing function that outputs a larger value as the battery consumption b becomes higher. As a result, a lower battery consumption b identifies a larger reward r. With such a reward r, the control model M can be learned so as to output the control information for causing the unmanned aerial vehicle P to fly so as to reduce the battery consumption b as much as possible even under the influence in particular of the weather. Incidentally, g(b) may be a function that outputs a predetermined value while the battery consumption b is less than or equal to a predetermined threshold value, and that monotonically increases (monotonically increases in a narrow sense) according to the battery consumption b when the battery consumption b exceeds the predetermined threshold value.

Alternatively, g(b) may be a function that outputs a first value while the battery consumption b is less than or equal to a predetermined threshold value, and that outputs a second value larger than the first value when the battery consumption b exceeds the predetermined threshold value. For example, the predetermined threshold value is set to be the same as the maximum capacity of the battery mounted in the unmanned aerial vehicle P, and the second value is set to an extremely large value (for example, a value greater than or equal to the reference reward X or infinity, etc.). With such a reward r, the control model M can be learned so as to output control information for causing the unmanned aerial vehicle P to fly while the battery consumption b does not exceed the maximum capacity of the battery even under the influence in particular of the weather.

(x) Reward r According to Moving State of Unmanned Aerial Vehicle P

In this case, on the basis of the environmental information input to the control model M and the control information output from the control model M by inputting the environmental information, the reward identifying unit 23d identifies the moving state of the unmanned aerial vehicle P (an example of the state information) when the unmanned aerial vehicle P takes the action based on the control information. That is, the moving state of the unmanned aerial vehicle P after the transition from the state s by the action a is identified. Here, examples of the moving state of the unmanned aerial vehicle P include a flight state (a state during moving), a paused state, and the like. The flight state can be further divided into a state during constant speed movement, acceleration, or deceleration. These flight states can be identified based on the flight speed or flight acceleration included in the environmental information. Moreover, the paused state can further be divided into a hovering state or a landing state (a state during landing). The landing state can be identified based on the altitude included in the environmental information.

Then, the reward identifying unit 23d identifies the reward r from the moving state of the unmanned aerial vehicle P, for example, using the reward table or the reward calculation formula. That is, the reward identifying unit 23d identifies the reward r that varies depending on the moving state of the unmanned aerial vehicle P when the unmanned aerial vehicle P takes the action a. For example, when the unmanned aerial vehicle P is in the hovering state, a negative reward r (for example, r=2) is preferably identified. This is because hovering the unmanned aerial vehicle P is not efficient in terms of required flight time and battery consumption, and is inefficient, in particular, when affected by the weather. With such a reward r, the control model M can be learned so as to output control information for causing the unmanned aerial vehicle P to efficiently fly in terms of the required flight time and the battery consumption even under the influence in particular of the weather. However, the reward r identified when the unmanned aerial vehicle P is not in the no-fly zone and is in a hovering state is desirably larger than the reward r (for example, r=−5) when the unmanned aerial vehicle P stays in the no-fly zone.

Incidentally, not all of the rewards r of (i) to (x) described above may need to be used. For example, even if the reward r of (v), (viii) or the like is not used, as long as the rewards r of (i), (ii), (ii), (vii) and the like are used, it is considered possible to obtain the same effect to a considerable extent. However, by using the reward r of (v) or (viii), the learning efficiency is improved and the effect of reducing the number of learnings can be expected. Moreover, when two or more of the rewards r of (i) to (x) are used, the final reward may be the sum of the rewards r calculated for each of (i) to (x), or may be the largest of any of the rewards r (or the smallest reward r).

The learning control unit 23e controls the reinforcement learning of the control model M using the reward r identified by the reward identifying unit 23d. That is, the learning control unit 23e updates the control model M so as to output control information for allowing a larger reward r to be obtained based on the reward r identified by the reward identifying unit 23d. By repeating the update, a learned control model M can be obtained. For example, in the case of reinforcement learning using a value-based learning algorithm, the action value function Q (s, a) is successively updated based on the reward r and the TD error is minimized (for example, converged to 0), so that the learned control model M is obtained. Moreover, when the control model M is constructed by a neural network, the weighting coefficients w of a plurality of layers of the neural network are successively updated and the error function L is minimized, so that the learned control model M can be obtained. On the other hand, in the case of reinforcement learning using a policy-based learning algorithm, the policy π is successively updated based on the reward r and the expected cumulative reward J(θ) is maximized, so that the learned control model M is obtained. Incidentally, a well-known reinforcement learning technique can be applied to the reinforcement learning controlled by the learning control unit 23e, and the weighting coefficient may be updated (for example, optimized) by a method according to the reinforcement learning technique.

As described above, the learning system SY1 may include at least one of the real unmanned aerial vehicle P1 and the simulator L. When the learning system SY1 includes only the real unmanned aerial vehicle P1, the learning device D provides control information to the real unmanned aerial vehicle P1 while performing reinforcement learning based on the observation data provided by the real unmanned aerial vehicle P1. According to the reinforcement learning using the real unmanned aerial vehicle P1, it is possible to perform learning in an environment (real space) closer to actual operation, and it is expected that a control model M capable of more efficient control can be obtained. On the other hand, when the learning system SY1 includes only the simulator L, the learning device D provides control information to the simulator L while performing reinforcement learning based on the observation data provided by the simulator L. According to the reinforcement learning using the simulator L, it is not necessary to use the real unmanned aerial vehicle P1, so that various patterns can be learned more safely and at low cost. Therefore, when both the real unmanned aerial vehicle P1 and the simulator L are applicable, for example, the control model M, which has been reinforcement-learned to some extent by using the simulator L first, may further be reinforcement-learned by using the real unmanned aerial vehicle P1. By performing learning in this order, it is possible to achieve both safety or learning efficiency and highly efficient flight control.

[5. Operation of Learning Device D]

Figure 8B:
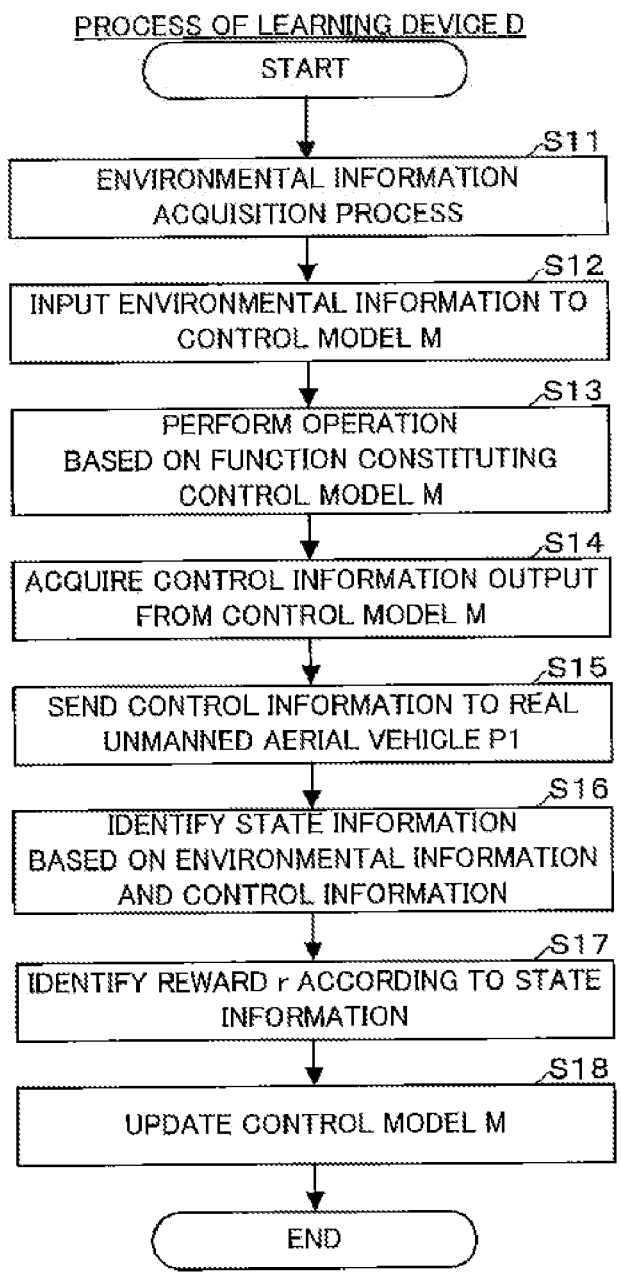
FIG. 8B is a flowchart showing an example of a process of the learning device D.

Next, an operation of the learning device D will be described with reference to FIGS. 8A and 8B. FIG. 8A is a flowchart showing an example of a process of the real unmanned aerial vehicle P1. FIG. 8B is a flowchart showing an example of a process of the learning device D. Incidentally, the process shown in FIG. 8A can also be applied to the simulator L.

The process shown in FIG. 8A is started when the real unmanned aerial vehicle P1 departs from a departure point. When the process shown in FIG. 8A is started, the control unit 14 acquires position information, sensing data, attitude data, vibration data, and battery information from the sensor unit 13 (step S1). Next, the control unit 14 sends the observation data including all or part of the position information, the sensing data, the attitude data, the vibration data, and the battery information acquired at step S1 to the learning device D via the communication unit 11. (Step S2). When the control information sent from the learning device D is received via the communication unit 11 in response to this (step S3), the control unit 14 performs flight control of the real unmanned aerial vehicle P1 on the basis of the control information (step S4).

Next, the control unit 14 determines whether or not the real unmanned aerial vehicle P1 has arrived at the destination (step S5). When it is determined that the real unmanned aerial vehicle P1 has not arrived at the destination (step S5: NO), the process returns to step S1. On the other hand, when it is determined that the real unmanned aerial vehicle P1 has arrived at the destination (step S5: YES), the process shown in FIG. 8A ends.

On the other hand, when the learning device D receives the observation data from the real unmanned aerial vehicle P1, the learning device D starts the process shown in FIG. 8B. When the process shown in FIG. 8B is started, the control unit 23 executes an environmental information acquisition process by the environmental information acquisition unit 23b (step S11). The environmental information acquisition process is a process for acquiring environmental information on the environment E of the real unmanned aerial vehicle P1 on the basis of the received observation data.

In the environmental information acquisition process, only the observation data received this time may be used for the acquisition of the environmental information. Alternatively, one or more observation data received before the previous time may be used together with the observation data received this time for the acquisition of the environmental information. When the number of observation data required to acquire the environmental information is not received, the process shown in FIG. 8B may end. Moreover, in the environmental information acquisition process, as described above, the action prediction unit 23a may predict the action of a moving object existing in the environment E of the real unmanned aerial vehicle P1. In this case, along with one or more observation data including the observation data received this time, action prediction information on the action of the moving object is acquired as environmental information.

Alternatively, in the environmental information acquisition process, a three-dimensional map of the environment E may be created as environmental information by executing a SLAM process using one or more observation data received before the previous time together with the observation data received this time. As described above, the position and attitude of the real unmanned aerial vehicle P1 and the position, moving course, and moving speed of the moving object in the environment E are preferably integrated into the three-dimensional map created as environmental information. Further, the ground surface characteristics in the environment E are preferably integrated in the three-dimensional map created as environmental information.

Next, the control unit 23 reads the control model M from the storage unit 22, inputs the environmental information acquired at step S11 as the state s into the read control model M (step S12), and perform an operation based on the function constituting the control model M (step S13). Subsequently, the control unit 23 acquires the control information output from the control model M (step S14). Then, the control unit 23 sends the control information acquired at step S14 to the real unmanned aerial vehicle P1 via the communication unit 21 (step S15). The control information thus sent is received at step S3 shown in FIG. 8A.

Next, the control unit 23 identifies the above-mentioned state information on the basis of the environmental information input to the control model M at step S12 and the control information output from the control model M by inputting the environmental information (step S16). Subsequently, the control unit 23 identifies the reward r (for example, any one or more of the rewards r of (i) to (x) described above) according to the state information identified at step S16 by the reward identifying unit 23d (step S17).

Next, the control unit 23 updates the control model M by the learning control unit 23e so as to output the control information for allowing a larger reward r to be obtained based on the reward r identified at step S17 (step S18), and the process shown in FIG. 8B ends. Thus, the process shown in FIG. 8B is performed every time the observation data is received from the real unmanned aerial vehicle P1, and reinforcement learning is performed, to thereby finally obtain the learned control model M.

[6. Outline of Configuration and Function of Flight Control System SY2]

Figure 9:
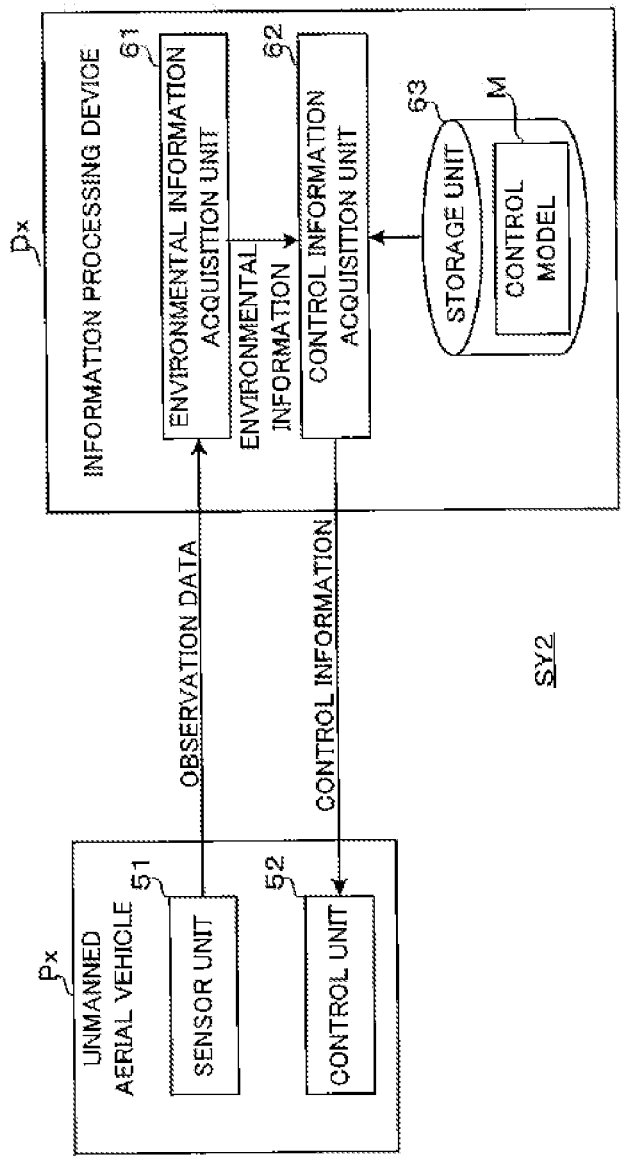
FIG. 9 is a diagram showing an outline configuration example of a flight control system SY2 of the present embodiment.

Next, an outline of a configuration and a function of a flight control system SY2 of the present embodiment will be described with reference to FIG. 9. FIG. 9 is a diagram showing an outline configuration example of the flight control system SY2 of the present embodiment. As described above, the use of the learned control model M obtained by reinforcement learning by the learning system SY1 allows the flight control of the real unmanned aerial vehicle P1 to be performed so that the real unmanned aerial vehicle P1 efficiently flies in terms of the required flight time, the battery consumption, and the like even under the influence in particular of the weather. As shown in FIG. 9, the flight control system SY2 includes an unmanned aerial vehicle Px and an information processing device Dx. The unmanned aerial vehicle Px and the information processing device Dx can communicate with each other via a communication network (not shown).

As shown in FIG. 9, the unmanned aerial vehicle Px includes a sensor unit 51 and a control unit 52. Incidentally, the unmanned aerial vehicle Px may have the same configuration as the real unmanned aerial vehicle P1 shown in FIG. 4. That is, the sensor unit 51 and the control unit 52 correspond to the sensor unit 13 and the control unit 14 shown in FIG. 4, respectively. Moreover, although not shown in FIG. 9, the unmanned aerial vehicle Px includes the communication unit 11 and the drive unit 12 shown in FIG. 4. The control unit 52 (flight control unit) of the unmanned aerial vehicle Px performs flight control of the unmanned aerial vehicle Px on the basis of the control information received from the information processing device Dx via the communication unit 11.

As shown in FIG. 9, the information processing device Dx includes an environmental information acquisition unit 61, a control information acquisition unit 62, and a storage unit 63. The storage unit 63 stores the learned control model M obtained by performing reinforcement learning using the reward r described above. The environmental information acquisition unit 61 and the control information acquisition unit 62 correspond to the environmental information acquisition unit 23b and the control information acquisition unit 23c shown in FIG. 7, respectively. That is, the environmental information acquisition unit 61 acquires the environmental information on the environment E of the unmanned aerial vehicle Px in time series on the basis of the observation data provided in time series by the unmanned aerial vehicle Px. The control information acquisition unit 62 reads the learned control model M from the storage unit 63, and inputs the environmental information acquired by the environmental information acquisition unit 61 as the state s to the read control model M, to thereby acquire the control information output from the learned control model M.

In the flight control system SY2, highly efficient flight control of the unmanned aerial vehicle Px can be realized by using the learned control model M. Incidentally, the control unit 52 may be provided in the information processing device Dx. Moreover, the unmanned aerial vehicle Px and the information processing device Dx may be an integrated device.

As described above, according to the above embodiment, since the learning system SY1 is configured so as to acquire the control information output from the control model M by inputting to the control model M environmental information including weather information in at least one of the surrounding environment of the unmanned aerial vehicle P and the environment of a planned flight area of the unmanned aerial vehicle P, and when the unmanned aerial vehicle P takes an action based on the control information, to perform reinforcement learning of the control model M using the reward r representing the evaluation of the result of the action, it is possible to obtain control information for performing flexible flight control that reduces the influence of the weather in the surrounding environment of an aerial vehicle capable of flying unmanned. In particular, since it is configured such that the reward r that varies depending on the attitude, flight stability, altitude, or the like of the unmanned aerial vehicle P is identified when the unmanned aerial vehicle P takes the action a, it is possible to perform learning of the control model M so as to output control information for causing the unmanned aerial vehicle P to perform a flight that ensures sufficient safety, such as the stability and flight altitude of the unmanned aerial vehicle P even under the influence of the weather.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in the above embodiment, the configuration for inputting to the control model M environmental information including weather information in at least one of the surrounding environment of the unmanned aerial vehicle P and the environment of the planned flight area of the unmanned aerial vehicle P has been described. Further, a configuration is also conceivable such that the environmental information input to the control model M does not include weather information in the surrounding environment of the unmanned aerial vehicle P and the environment of the planned flight area of the unmanned aerial vehicle P. In the learning device D in such a case, when the rewards r of (i) to (x) are identified in the same manner as in the above embodiment, it is possible to perform learning of the control model M so as to output control information for causing the unmanned aerial vehicle P to perform a flight that ensures sufficient safety, such as the stability and flight altitude of the unmanned aerial vehicle P even under situations where weather and the like are not considered. This can solve problems such that, for example, when the unmanned aerial vehicle P flies under the influence of dust, volcanic ashes, and the like, or unknown factors in the surrounding environment of the unmanned aerial vehicle P or the environment of the planned flight area of the unmanned aerial vehicle P, the power consumption increases or the flight becomes unstable, which makes it possible to obtain control information for performing flexible flight control to reduce these effects. Moreover, in the above embodiment, the unmanned aerial vehicle P has been described as an example of an aerial vehicle capable of flying unmanned, but the aerial vehicle capable of flying unmanned is also applicable to a manned aerial vehicle that can fly even if there is no pilot in the aerial vehicle.

REFERENCE SIGNS LIST

11 Communication unit
12 Drive unit
13 Sensor unit
13a Positioning sensor
13b Optical sensor
13c Attitude sensor
13d Battery sensor
13e Weather sensor
14 Control unit
14a Environmental information providing unit
14b Control information acquisition unit
14c Flight control unit
21 Communication unit
22 Storage unit
23 Control unit
23a Action prediction unit
23b Environmental information acquisition unit
23c Control information acquisition unit
23d Reward identifying unit
23e Learning control unit
51 Sensor unit
52 Control unit
61 Environmental information acquisition unit
62 Control information acquisition unit
63 Storage unit
P,Px Unmanned aerial vehicle
P1 Real unmanned aerial vehicle
P2 Virtual unmanned aerial vehicle
L Simulator
D Learning device
Dx Information processing device
SY1 Learning system
SY2 Flight control system

The invention claimed is:

1. A learning device for performing reinforcement learning of a machine learning model to control a flight of an aerial vehicle that outputs control information for performing flight control of an aerial vehicle capable of flying unmanned, the learning device comprising:
at least one memory configured to store program code; and
at least one processor configured to access the program code and operate as instructed by the program code, the program code including:
environmental information acquisition code configured to cause the at least one processor to acquire environmental information related to at least one of a surrounding environment of the aerial vehicle and an environment of a planned flight area of the aerial vehicle, the environmental information comprising a three-dimensional map of the surrounding environment of the aerial vehicle based on Simultaneous Localization and Mapping (SLAM) and the environment of the planned flight area of the aerial vehicle, wherein the three-dimensional map incorporates weather information of at least one of the surrounding environment of the aerial vehicle and the environment of the planned flight area of the aerial vehicle, and wherein the weather information comprises wind information;

control information acquisition code configured to cause the at least one processor to acquire the control information output from the machine learning model to control the flight of the aerial vehicle by inputting the environmental information as an environment state to the machine learning model, the control information being a plurality of action value functions or a probability distribution corresponding to a plurality of different actions of the aerial vehicle;

selection code configured to cause the at least one processor to:
- based on the control information being the probability distribution, select an action of the aerial vehicle, from among the plurality of different actions, according to the probability distribution, or
- based on the control information being the plurality of action value functions, select the action of the aerial vehicle according to an action value function having a largest value from among the plurality of action value functions;

reward identifying code configured to cause the at least one processor to identify a reward that represents an evaluation of a result of the selected action; and learning control code configured to cause the at least one processor to control reinforcement learning of the machine learning model to control the flight of the aerial vehicle using the reward that is identified by the reward identifying code.

2. The learning device according to claim 1, wherein the reward identifying code causes the at least one processor to identify a second reward that varies depending on an attitude of the aerial vehicle when the aerial vehicle takes the action.

3. The learning device according to claim 1, wherein the reward identifying code causes the at least one processor to identify a second reward that varies depending on flight stability of the aerial vehicle when the aerial vehicle takes the action.

4. The learning device according to claim 3, wherein the flight stability is evaluated based on vibration of the aerial vehicle.

5. The learning device according to claim 1, wherein the reward identifying code causes the at least one processor to identify a second reward that varies depending on an altitude of the aerial vehicle when the aerial vehicle takes the action.

6. The learning device according to claim 1, wherein the reward identifying code causes the at least one processor to identify a second reward that varies depending on whether or not the altitude of the aerial vehicle is included in a specific altitude range when the aerial vehicle takes the action.

7. The learning device according to claim 6, wherein the altitude range dynamically changes based on sensing data that is obtained by non-contact sensing by the aerial vehicle.

8. The learning device according to claim 1, wherein the reward identifying code causes the at least one processor to identify a second reward that varies depending on relationship between an accumulated precipitation on the aerial vehicle and a threshold value according to waterproof performance of the aerial vehicle when the aerial vehicle takes the action, wherein the accumulated precipitation is based on sensor data from a rain sensor, and the waterproof performance is based on a model and a specification of the aerial vehicle.

9. The learning device according to claim 1, wherein the reward identifying code causes the at least one processor to identify a second reward that varies depending on a remaining capacity of a battery of the aerial vehicle or consumption of the battery when the aerial vehicle takes the action.

10. The learning device according to claim 1, wherein the reward identifying code causes the at least one processor to identify the reward that varies depending on the ground surface characteristics in a-the surrounding environment of the aerial vehicle when the aerial vehicle takes the action, the ground surface characteristics indicating presence or absence of sidewalks, roadways, railroad tracks, fields, buildings, or rivers.

11. The learning device according to claim 1, wherein the reward identifying code causes the at least one processor to identify a second reward that varies depending on a moving state of the aerial vehicle when the aerial vehicle takes the action.

12. The learning device according to claim 1, wherein the wind information includes information on at least one of wind speed, wind direction, presence or absence of wind, presence or absence of strong wind, typhoon, and tornado.

13. An information processing device comprising:
at least one memory configured to store program code; and at least one processor configured to access the program code and operate as instructed by the program code, the program code including:

storage code configured to cause the at least one processor to store a learned machine learning model to control a flight of an aerial vehicle that inputs environmental information related to a surrounding environment of an aerial vehicle capable of flying unmanned and an environment of a planned flight area of the aerial vehicle, the environmental information comprising a three-dimensional map of the surrounding environment of the aerial vehicle based on Simultaneous Localization and Mapping (SLAM) and the environment of the planned flight area of the aerial vehicle, wherein the three-dimensional map incorporates weather information of at least one of the surrounding environment of the aerial vehicle and the environment of the planned flight area of the aerial vehicle, and wherein the weather information comprises wind information, and outputs control information for performing flight control of the aerial vehicle, the machine learning model to control the flight of the aerial vehicle being obtained by performing reinforcement learning using a reward representing an evaluation of a result of an action of the aerial vehicle when the aerial vehicle takes the action based on the control information;

control information acquisition code configured to cause the at least one processor to acquire the control information output from the machine learning model to control the flight of the aerial vehicle by inputting the environmental information, as an environment state, including weather information to the machine learning model to control the flight of the aerial vehicle, the control information being a plurality of action value functions or a probability distribution corresponding to a plurality of different actions of the aerial vehicle; and selection code configured to cause the at least one processor to:
- based on the control information being the probability distribution, select an action of the aerial vehicle, from among the plurality of different actions, according to the probability distribution, or based on the control information being the plurality of action value functions, select the action of the aerial vehicle according to an action value function having a largest value from among the plurality of action value functions.

14. The information processing device according to claim 13, the program code further including flight control code configured to cause the at least one processor to perform flight control of the aerial vehicle on the basis of the control information.

15. A non-transitory computer readable memory having stored thereon a learned machine learning model to control a flight of an aerial vehicle configured to cause a computer to function so as to output control information for performing flight control of an aerial vehicle capable of flying unmanned, based on environmental information on a surrounding environment of the aerial vehicle and an environment of a planned flight area of the aerial vehicle, the environmental information comprising a three-dimensional map of the surrounding environment of the aerial vehicle based on Simultaneous Localization and Mapping (SLAM) and the environment of the planned flight area of the aerial vehicle, wherein the three-dimensional map incorporates weather information of at least one of the surrounding environment of the aerial vehicle and the environment of the planned flight area of the aerial vehicle, and wherein the weather information comprises wind information, wherein
the environmental information is input as an environment state to the learned machine learning model to control the flight of the aerial vehicle in time series,
the learned machine learning model to control the flight of the aerial vehicle is reinforcement-learned using a reward representing an evaluation of a result of an action of the aerial vehicle when the aerial vehicle takes the action based on the control information output from the learned machine learning model to control the flight of the aerial vehicle, the control information being a plurality of action value functions or a probability distribution corresponding to a plurality of different actions of the aerial vehicle,
the learned machine learning model to control the flight of the aerial vehicle causes a computer to function so as to perform an operation based on a function constituting the learned machine learning model to control the flight of the aerial vehicle with respect to the input environmental information and output the control information from the machine learning model to control the flight of the aerial vehicle, and
the learned machine learning model causes a computer to function so as to:
based on the control information being the probability distribution, select an action of the aerial vehicle, from among the plurality of different actions, according to the probability distribution, or
based on the control information being the plurality of action value functions, select the action of the aerial vehicle according to an action value function having a largest value from among the plurality of action value functions.

16. The learning device according to claim 1, the program code further including action prediction code configured to cause the at least one processor to predict an action of a moving object of which position changes in time series in the surrounding environment of the aerial vehicle,
wherein the environmental information acquisition code causes the at least one processor to acquire the environmental information including action prediction information of the moving object of which action is predicted by the action prediction unit, and
the control information acquisition code causes the at least one processor to acquire the control information output from the machine learning model to control the flight of the aerial vehicle by inputting the environmental information including the action prediction information of the moving object to the machine learning model to control the flight of the aerial vehicle.

17. The learning device according to claim 16, wherein the reward identifying code causes the at least one processor to identify a second reward that varies depending on positional relationship between the aerial vehicle and the moving object when the aerial vehicle takes the action.

* * * * *